(12) United States Patent
Manolakos et al.

(10) Patent No.: US 11,848,880 B2
(45) Date of Patent: Dec. 19, 2023

(54) USING MEDIUM ACCESS CONTROL CONTROL ELEMENTS TO SCHEDULE SEMI-PERSISTENT SOUNDING REFERENCE SIGNALS FOR POSITIONING

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/164,316

(22) Filed: Feb. 1, 2021

(65) Prior Publication Data
US 2021/0242991 A1 Aug. 5, 2021

Related U.S. Application Data

(60) Provisional application No. 62/970,093, filed on Feb. 4, 2020.

(51) Int. Cl.
*H04L 5/00* (2006.01)
*H04W 28/26* (2009.01)

(52) U.S. Cl.
CPC ........... *H04L 5/0048* (2013.01); *H04W 28/26* (2013.01)

(58) Field of Classification Search
CPC .................................................... H04W 28/26
See application file for complete search history.

(56) References Cited

U.S. PATENT DOCUMENTS

2019/0280835 A1* 9/2019 Määttänen ............ H04L 5/0053
2019/0281588 A1 9/2019 Zhang et al.
(Continued)

FOREIGN PATENT DOCUMENTS

CA 3097844 A1 10/2019
WO 2006110319 10/2006
(Continued)

OTHER PUBLICATIONS

3GPP TS 36.321: "3rd Generation Partnership Project; Technical Specification Group Radio Access Network; Evolved Universal Terrestrial Radio Access (E-UTRA); Medium Access Control (MAC) Protocol Specification (Release 15)", 3GPP TS 36.321 V15.8.0 (Dec. 2019), pp. 1-134.
(Continued)

*Primary Examiner* — Elton Williams
(74) *Attorney, Agent, or Firm* — QUALCOMM Incorporated

(57) ABSTRACT

Disclosed are techniques for wireless communication. In an aspect, a user equipment (UE) receives, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning, and transmits the SP SRS-for-positioning on one or more SRS resources configured for the UE, the SP SRS-for-positioning having transmission parameters adopted from a spatial relation reference signal for the SP SRS-for-positioning.

84 Claims, 21 Drawing Sheets

(56) References Cited

U.S. PATENT DOCUMENTS

| | | |
|---|---|---|
| 2019/0349161 A1 | 11/2019 | Jin et al. |
| 2020/0266942 A1 | 8/2020 | Akkarakaran et al. |
| 2021/0282029 A1 | 9/2021 | Matsumura et al. |
| 2021/0297850 A1 | 9/2021 | Matsumura et al. |
| 2021/0314038 A1 | 10/2021 | Matsumura et al. |

FOREIGN PATENT DOCUMENTS

| | | | |
|---|---|---|---|
| WO | 2019203711 A1 | 10/2019 | |
| WO | 2020021723 A1 | 1/2020 | |
| WO | 2020021724 A1 | 1/2020 | |
| WO | 2020021725 A1 | 1/2020 | |
| WO | WO-2020167232 A1 * | 8/2020 | ........... H04L 5/0092 |

OTHER PUBLICATIONS

International Search Report and Written Opinion—PCT/US2021/016241—ISA/EPO—dated Apr. 30, 2021.
OPPO: "MAC CE Design for eMIMO,"3GPP Draft, 3GPP TSG-RAN WG2 Meeting #108, R2-1915158, 3rd Generation Partnership Project (3GPP), Mobile Competence Centre, 650, Route Des Lucioles, F-06921, Sophia-Antipolis Cedex, France, vol. RAN WG2. No. Reno. USA, Nov. 18, 2019-Nov. 22, 2019, Nov. 8, 2019 (Nov. 8, 2019), XP051817056, 6 pages, Retrieved from the Internet: URL: https://ftp.3gpp.org/tsg_ran/WG2_RL2/TSGR2_108/Docs/R2-1915158.zip R2-1915158 -MAC CE design for eMIMO.doc [retrieved on Nov. 8, 2019] p. 3; figures 6.1.3.17-1, and fig. 3.

* cited by examiner

User Plane Protocol Stack

Control Plane Protocol Stack

```
BWP-UplinkDedicated ::=        SEQUENCE {
  pucch-Config                 SetupRelease { PUCCH-Config }            OPTIONAL,  -- Need M
  pusch-Config                 SetupRelease { PUSCH-Config }            OPTIONAL,  -- Need M
  configuredGrantConfig        SetupRelease { ConfiguredGrantConfig }   OPTIONAL,  -- Need M
  srs-Config                   SetupRelease { SRS-Config }              OPTIONAL,  -- Need M
  beamFailureRecoveryConfig    SetupRelease { BeamFailureRecoveryConfig } OPTIONAL, -- Cond SpCellOnly
  ...
}
```

SRS-Config ::=                      SEQUENCE {
    srs-ResourceSetToReleaseList        SEQUENCE (SIZE(1..maxNrofSRS-ResourceSets)) OF SRS-ResourceSetId  OPTIONAL,   -- Need N
    srs-ResourceSetToAddModList         SEQUENCE (SIZE(1..maxNrofSRS-ResourceSets)) OF SRS-ResourceSet    OPTIONAL,   -- Need N
    srs-ResourceToReleaseList           SEQUENCE (SIZE(1..maxNrofSRS-Resources)) OF SRS-ResourceId        OPTIONAL,   -- Need N
    srs-ResourceToAddModList            SEQUENCE (SIZE(1..maxNrofSRS-Resources)) OF SRS-Resource          OPTIONAL,   -- Need N
    tpc-Accumulation                    ENUMERATED {disabled}                                             OPTIONAL,   -- Need S
    ...
}

SRS-Resource ::=                    SEQEUNCE {
    srs-ResourceId,
    ...
    spatialRelationInfo                 SRS-SpatialRelationInfo                                           OPTIONAL,   -- Need R
    ...
}

SRS-SpatialRelationInfo ::=         SEQUENCE {
    servingCellId                       ServCellIndex                                                     OPTIONAL,   -- Need S
    referenceSignal                     CHOICE {
                                            SSB-Index
                                            NZP-CSI-RS-ResourceId,
                                            SEQUENCE {
                                                SRS-ResourceId,
                                                BWP-Id
                                            }
                                    }
}
```

FIG. 6B

| Case ID for QCL Source of Each SRS Resource of the SP-SRS | Description | Number of Bits needed for Each Case | Reason for the Number of Bits Needed |
|---|---|---|---|
| Case 1 | SRS Resource for "Communication" | 6 Bits | Up to 64 Resources Per BWP and the BWP ID is Provided Separately |
| Case 2 | SSB ID | 6 Bits | Up to 64 Resources Per CC |
|  | PCI for SSB | 10 Bits | PCI is 10 Bits |
| Case 3 | CSI-RS Resource ID | 8 Bits | Up to 192 Resources, Requiring 8 Bits |
| Case 4 | SRS Resource ID for Positioning | 6 Bits | Up to 64 Resources Per BWP and the BWP ID is Provided Separately |
| Case 5 | DL PRS Resource ID in the Set | 6 Bits | Definition of X4 with Max Value of 64 |
|  | DL PRS Resource Set ID of the TRP | 3 Bits | Up to 2 Sets Per FL Per TRP |
|  | TRP ID | 8 Bits | Up to 256 TRPs across all FLs Per UE (X6) |

FIG. 8

| Case ID for QCL Source of Each SRS Resource of the SP -SRS | Description | Number of Bits Needed for Each Case |
|---|---|---|
| Case 1 | SRS Resource for "Communication" | 6 bits |
| Case 2 | SSB ID + PCI for SSB | 16 bits |
| Case 3 | CSIRS Resource ID | 8 bits |
| Case 4 | SRS Resource ID for Positioning | 6 bits |
| Case 5 | DL PRS Resource ID in the Set + DL PRS Resource Set ID of the TRP + TRP ID | 17 bits |

FIG. 9

| F = 100 | R | R | DL-PRS Resource Set ID | Oct 1 |
|---|---|---|---|---|
| R | R | DL-PRS Resource ID | | Oct 2 |
| DL-PRS-ID | | | | Oct 3 |
| R | Resource Serving Cell ID | | Resource BWP ID | Oct 4 |

*FIG. 11*

| F = 011 | SRS-for-Positioning Resource ID | Oct 1 |
|---|---|---|
| M | Resource Serving Cell ID | Resource BWP ID | Oct 2 |

*FIG. 12*

| F = 010 | R | R | R | R | R | Oct 1 |
|---|---|---|---|---|---|---|
| NZP CSI-RS Resource ID | | | | | | Oct 2 |
| R | Resource Serving Cell ID | | | | Resource BWP ID | Oct 3 |

| F = 001 | R | R | R | R | R | Oct 1 |
|---|---|---|---|---|---|---|
| SSB Index | | | | Physical Cell ID (MSBs) | | Oct 2 |
| Physical Cell ID (LSBs) | | | | | | Oct 3 |
| R | Resource Serving Cell ID | | | Resource BWP ID | | Oct 4 |

| F = 000 | SRS Resource ID | Oct 1 |
|---|---|---|
| M | Resource Serving Cell ID | Resource BWP ID | Oct 2 |

FIG. 15

… # USING MEDIUM ACCESS CONTROL CONTROL ELEMENTS TO SCHEDULE SEMI-PERSISTENT SOUNDING REFERENCE SIGNALS FOR POSITIONING

CROSS-REFERENCE TO RELATED APPLICATIONS

The present application for patent claims the benefit of U.S. Provisional Application No. 62/970,093, entitled "USING MEDIUM ACCESS CONTROL CONTROL ELEMENTS TO SCHEDULE SEMI-PERSISTENT SOUNDING REFERENCE SIGNALS FOR POSITIONING," filed Feb. 4, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE), comprising: receiving, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and transmitting the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

In an aspect, a method of wireless communication performed by a base station includes transmitting, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and receiving, from the UE, the SP SRS-for-positioning on one or more SRS resources configured to the UE for transmission of the SP SRS-for-positioning, the SP SRS-for-positioning having transmission parameters adopted from the spatial relation reference signal.

In an aspect, a UE includes a memory; at least one transceiver; and at least one processor communicatively coupled to the memory and the at least one transceiver, the at least one processor configured to: receive, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and transmit the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

In an aspect, a base station includes a memory; at least one transceiver; and at least one processor communicatively coupled to the memory and the at least one transceiver, the at least one processor configured to: transmit, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and receive, from the UE, the SP SRS-for-positioning on one or more SRS resources configured to the UE for transmission of the SP SRS-for-positioning, the SP SRS-for-positioning having transmission parameters adopted from the spatial relation reference signal.

In an aspect, a UE includes means for receiving, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and means for transmitting the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

In an aspect, a base station includes means for transmitting, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and means for receiving, from the UE, the SP SRS-for-positioning on one or more SRS resources configured to the UE for transmission of the SP SRS-for-positioning, the SP SRS-for-positioning having transmission parameters adopted from the spatial relation reference signal.

In an aspect, a non-transitory computer-readable medium storing computer-executable instructions includes computer-executable instructions comprising: at least one instruction instructing a user equipment (UE) to receive, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning; and at least one instruction instructing the UE to transmit the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

In an aspect, a non-transitory computer-readable medium storing computer-executable instructions includes computer-executable instructions comprising: at least one instruction instructing a base station to transmit, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and at least one instruction instructing the base station to receive, from the UE, the SP SRS-for-positioning on one or more SRS resources configured to the UE for transmission of the SP SRS-for-positioning, the SP SRS-for-positioning having transmission parameters adopted from the spatial relation reference signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 6A illustrates how a sounding reference signal (SRS) configuration is defined per bandwidth part (BWP).

FIG. 6B illustrates how SRS resource sets and/or SRS resources are configured within an SRS configuration.

FIG. 8 is a table defining the five quasi-colocation (QCL) source reference signal cases and the number of bits needed for each case.

FIG. 9 is a table defining the five cases in FIG. 8 and the number of bits needed to identify the QCL source reference signal for each case.

FIGS. 11 to 15 illustrate various spatial relation information fields, according to aspects of the disclosure.

DETAILED DESCRIPTION

Figure 1:
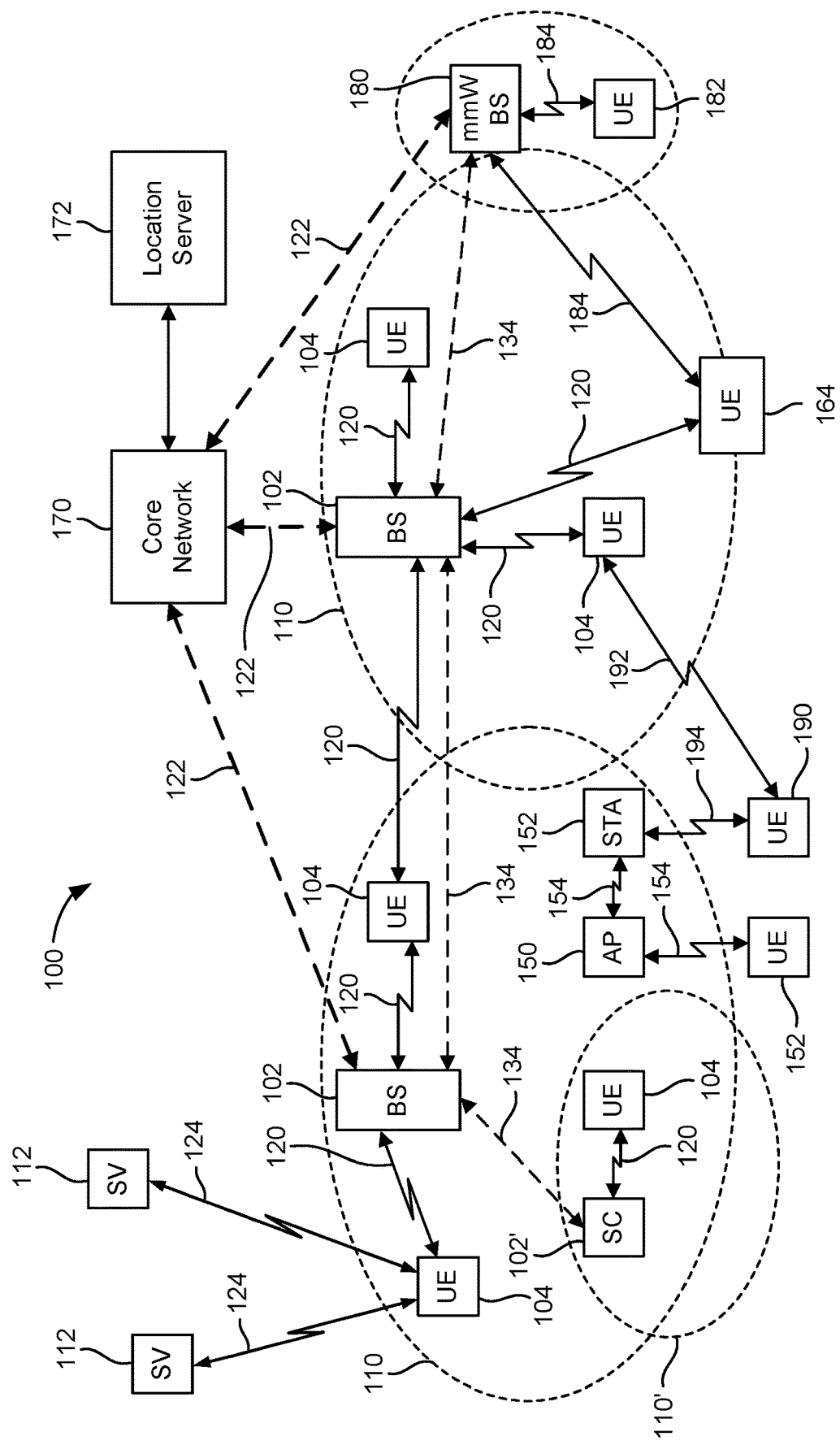
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
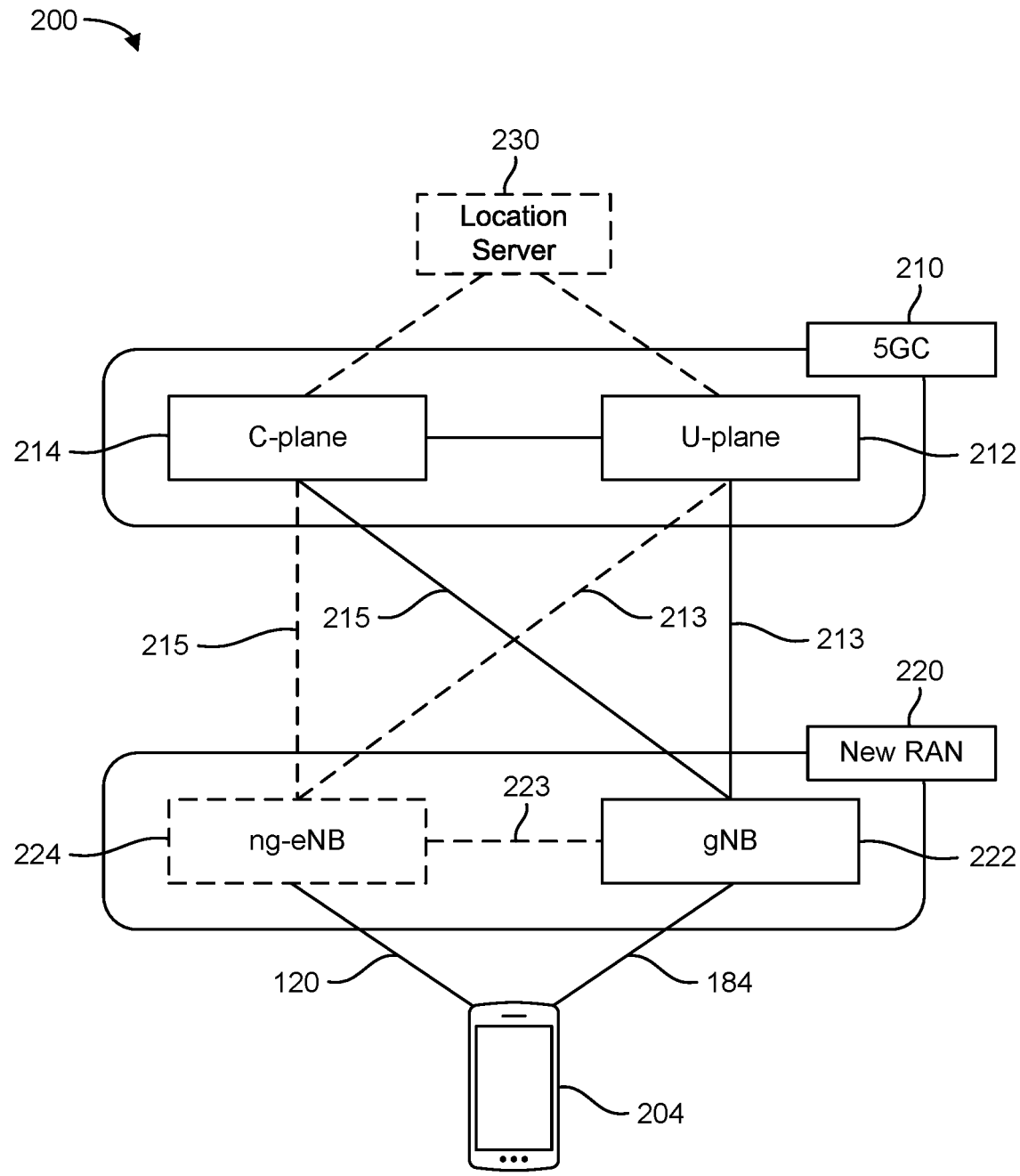
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
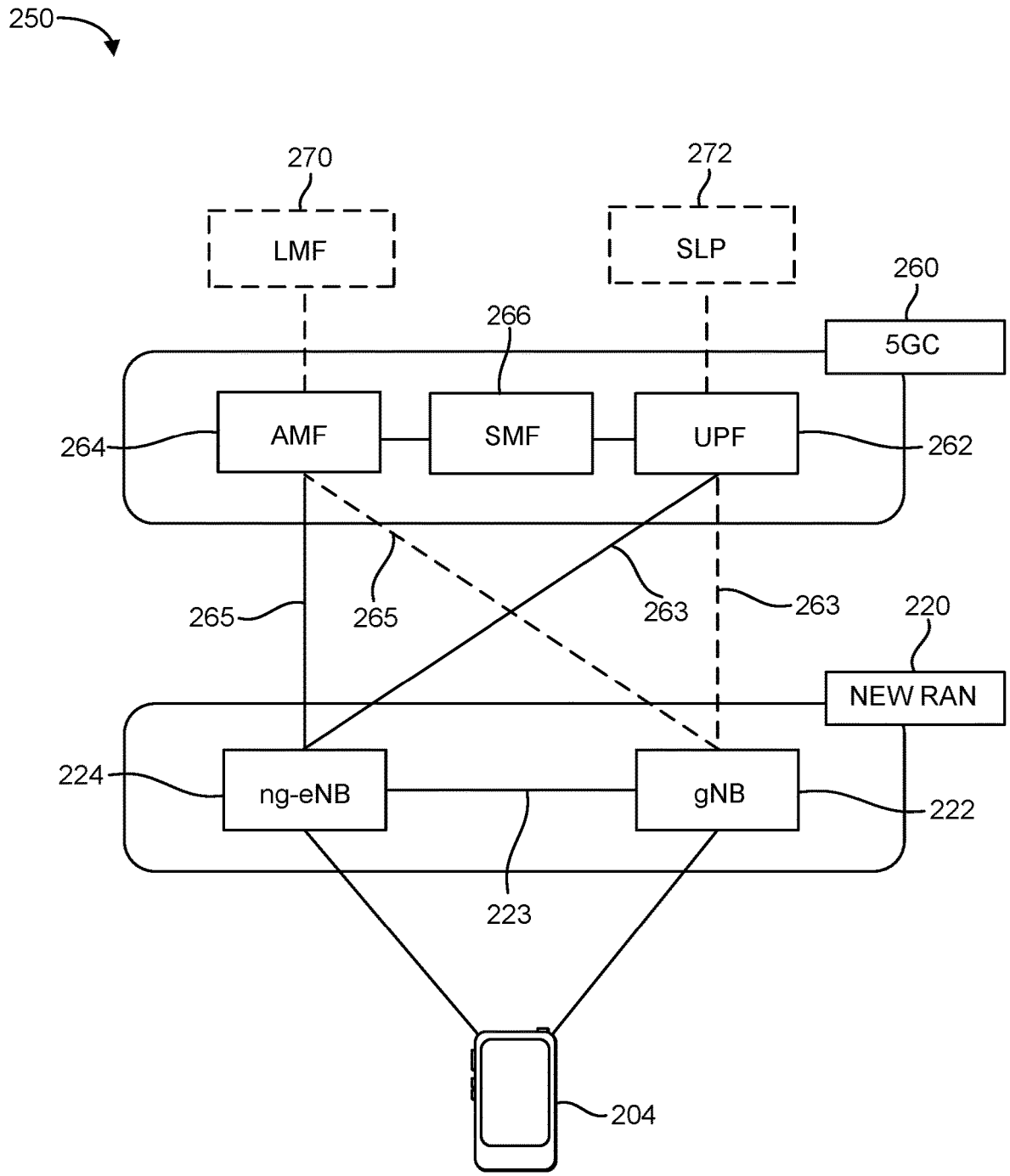

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
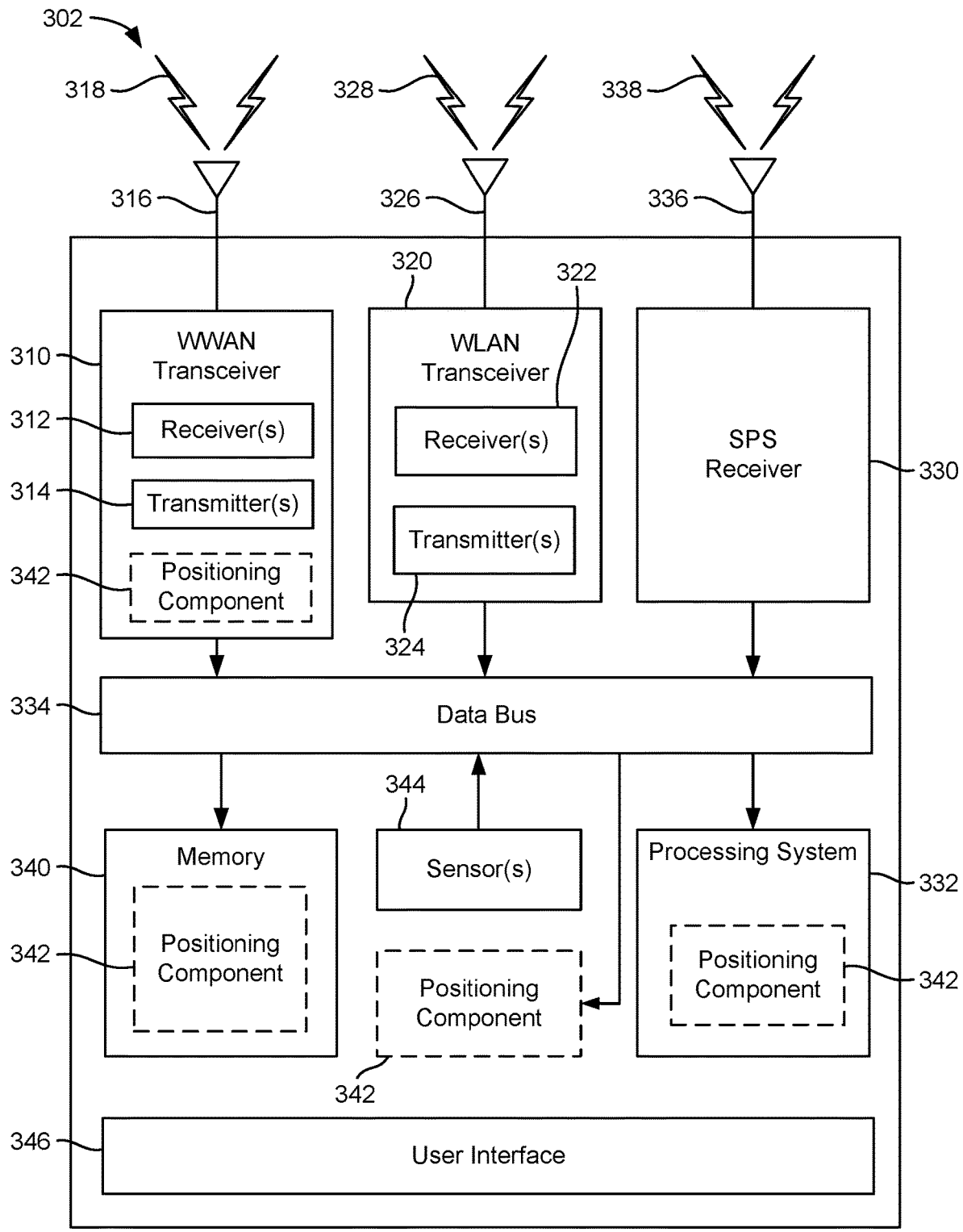
FIGS. 3A to 3C are simplified block diagrams of several sample aspects of components that may be employed in a user equipment (UE), a base station, and a network entity, respectively, and configured to support communications as taught herein.
Figure 3B:
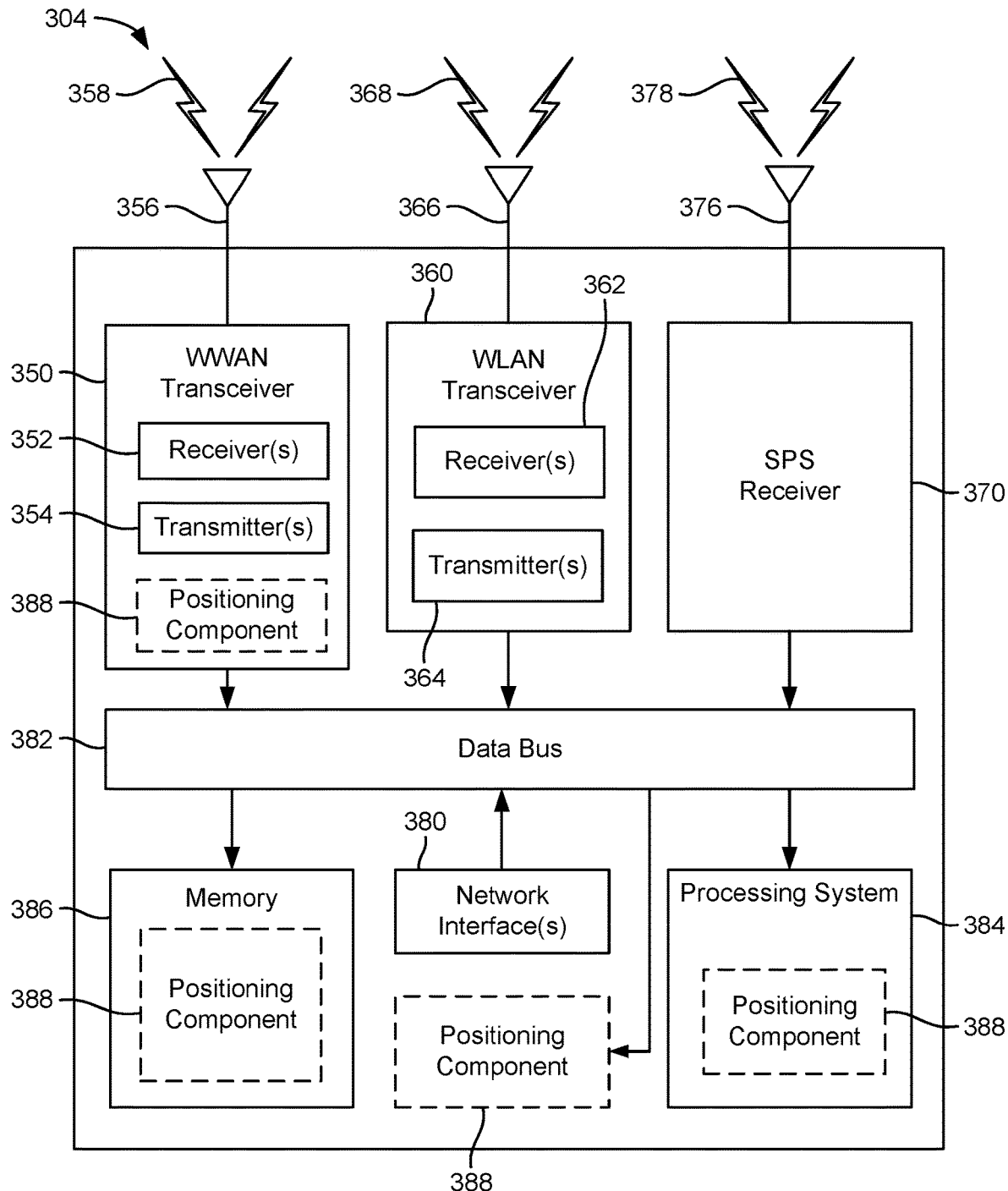
Figure 3C:
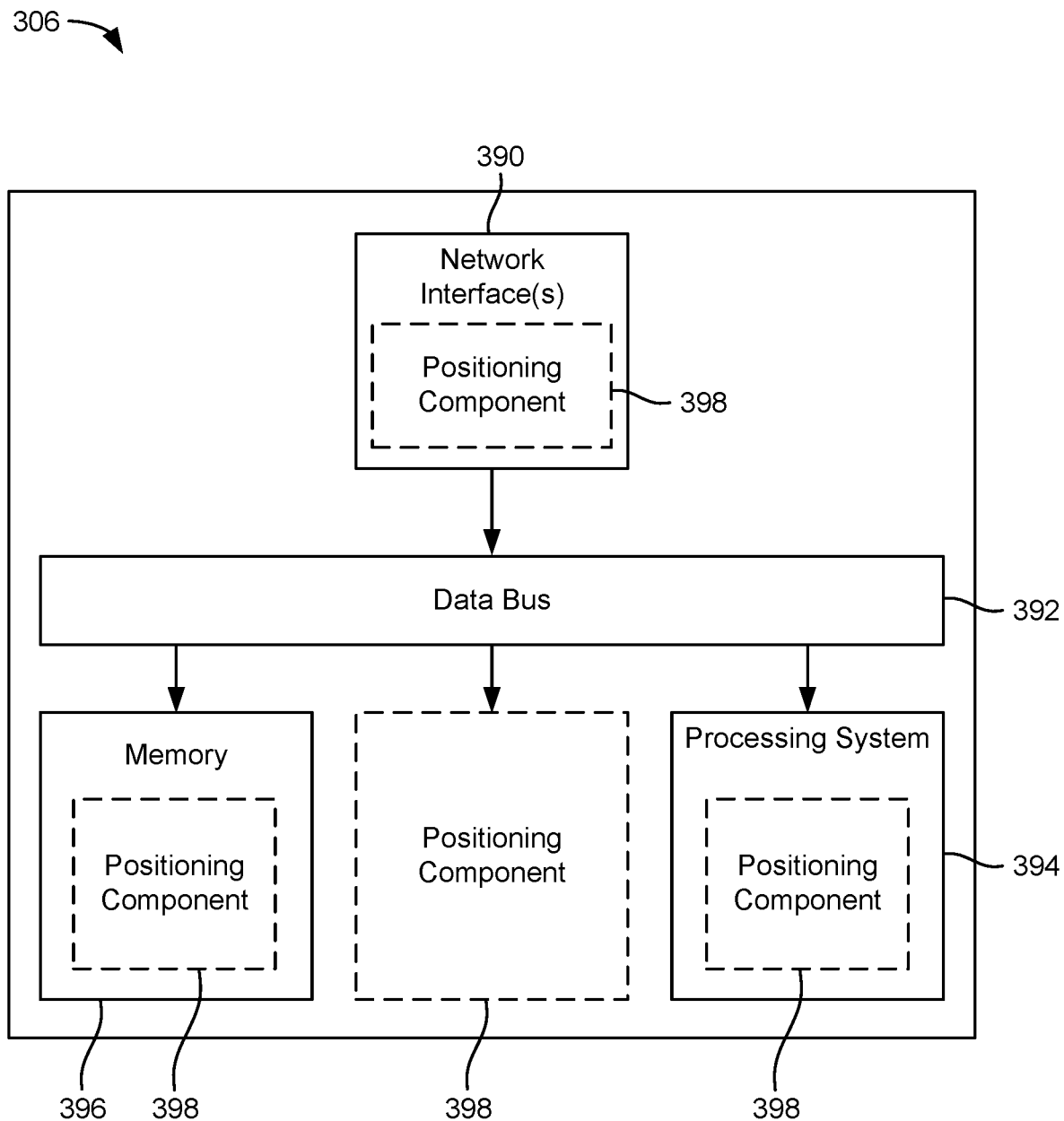

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

Figure 4A:
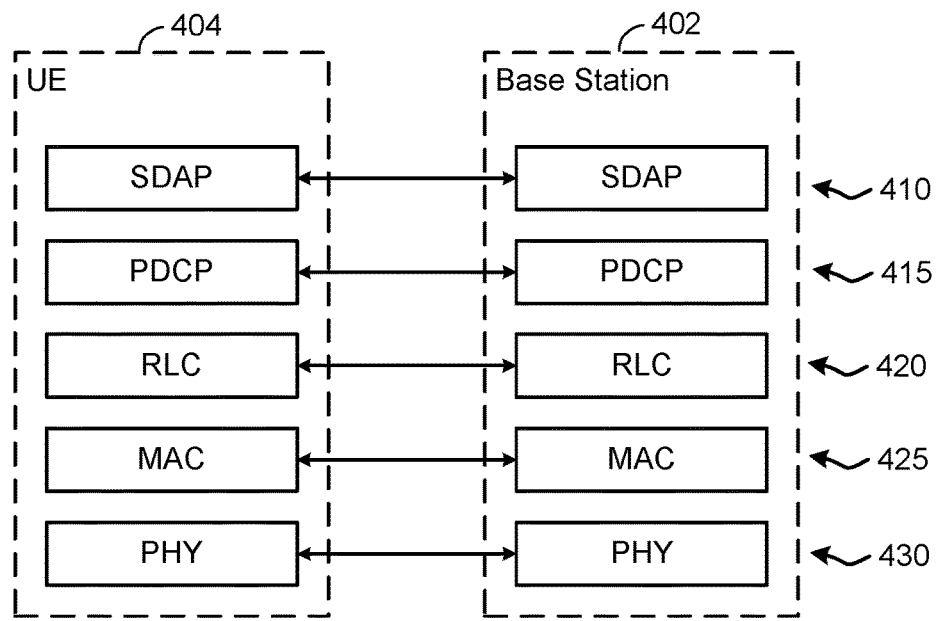
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a packet data convergence protocol (PDCP) layer 415, a radio link control (RLC) layer 420, a medium access control (MAC) layer 425, and a physical (PHY) layer 430. Particular instances of a protocol layer are referred to as protocol "entities." As such, the terms "protocol layer" and "protocol entity" may be used interchangeably.

As illustrated by the double-arrow lines in FIG. 4A, each layer of the protocol stack implemented by the UE 404 communicates with the same layer of the base station 402, and vice versa. The two corresponding protocol layers/entities of the UE 404 and the base station 402 are referred to as "peers," "peer entities," and the like. Collectively, the SDAP layer 410, the PDCP layer 415, the RLC layer 420, and the MAC layer 425 are referred to as "Layer 2" or "L2." The PHY layer 430 is referred to as "Layer 1" or "L1."

Figure 4B:
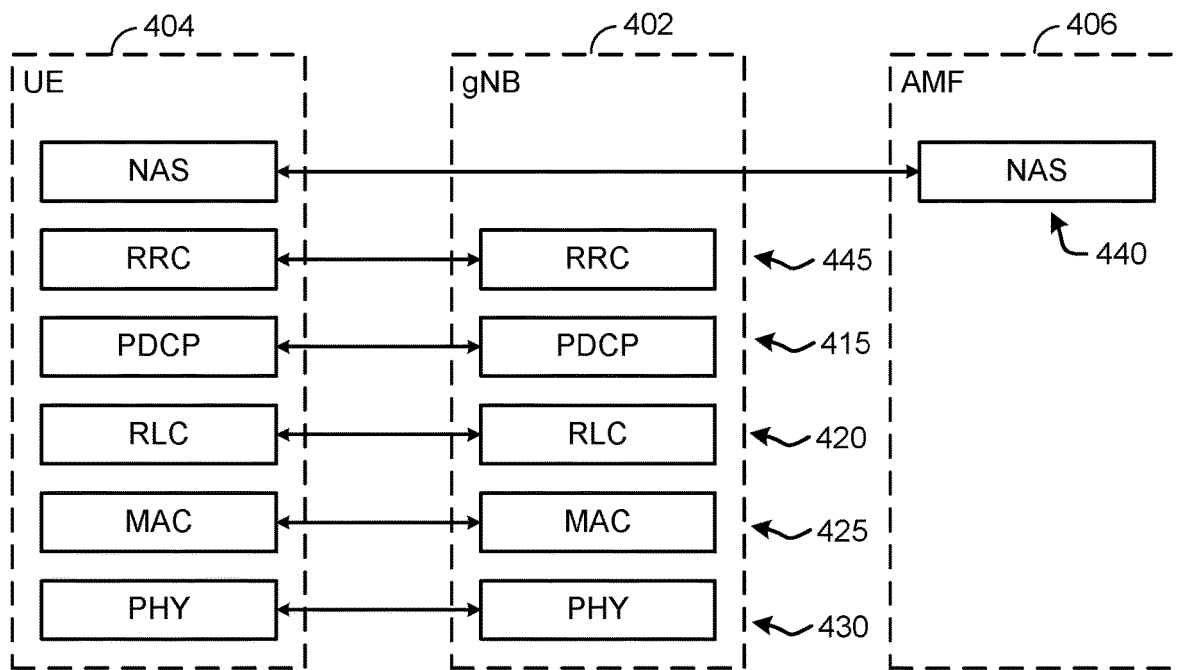

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement a radio resource control (RRC) layer 445. Further, the UE 404 and an AMF 406 implement a non-access stratum (NAS) layer 440.

The RLC layer 420 supports three transmission modes for packets: transparent mode (TM), unacknowledged mode (UM), and acknowledged mode (AM). In TM mode, there is no RLC header, no segmentation/reassembly, and no feedback (i.e., no acknowledgment (ACK) or negative acknowledgment (NACK)). In addition, there is buffering at the transmitter only. In UM mode, there is an RLC header, buffering at both the transmitter and the receiver, and segmentation/reassembly, but no feedback (i.e., a data transmission does not require any reception response (e.g., ACK/NACK) from the receiver). In AM mode, there is an RLC header, buffering at both the transmitter and the receiver, segmentation/reassembly, and feedback (i.e., a data transmission requires a reception response (e.g., ACK/NACK)

from the receiver). Each of these modes can be used to both transmit and receive data. In TM and UM modes, a separate RLC entity is used for transmission and reception, whereas in AM mode, a single RLC entity performs both transmission and reception. Note that each logical channel uses a specific RLC mode. That is, the RLC configuration is per logical channel with no dependency on numerologies and/or transmission time interval (TTI) duration (i.e., the duration of a transmission on the radio link). Specifically, the broadcast control channel (BCCH), paging control channel (PCCH), and common control channel (CCCH) use TM mode only, the dedicated control channel (DCCH) uses AM mode only, and the dedicated traffic channel (DTCH) uses UM or AM mode. Whether the DTCH uses UM or AM is determined by RRC messaging.

The main services and functions of the RLC layer 420 depend on the transmission mode and include transfer of upper layer protocol data units (PDUs), sequence numbering independent of the one in the PDCP layer 415, error correction through automatic repeat request (ARQ), segmentation and re-segmentation, reassembly of service data units (SDUs), RLC SDU discard, and RLC re-establishment. The ARQ functionality provides error correction in AM mode, and has the following characteristics: ARQ retransmissions of RLC PDUs or RLC PDU segments based on RLC status reports, polling for an RLC status report when needed by RLC, and RLC receiver triggering of an RLC status report after detection of a missing RLC PDU or RLC PDU segment.

The main services and functions of the PDCP layer 415 for the user plane include sequence numbering, header compression and decompression (for robust header compression (ROHC)), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a quality of service (QoS) flow and a data radio bearer and marking QoS flow identifier in both downlink and uplink packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain Internet protocol (IP) connectivity between the UE 404 and the packet data network (PDN). The NAS layer 440 performs evolved packet system (EPS) bearer management, authentication, EPS connection management (ECM)-IDLE mobility handling, paging origination in ECM-IDLE, and security control.

Figure 5A:
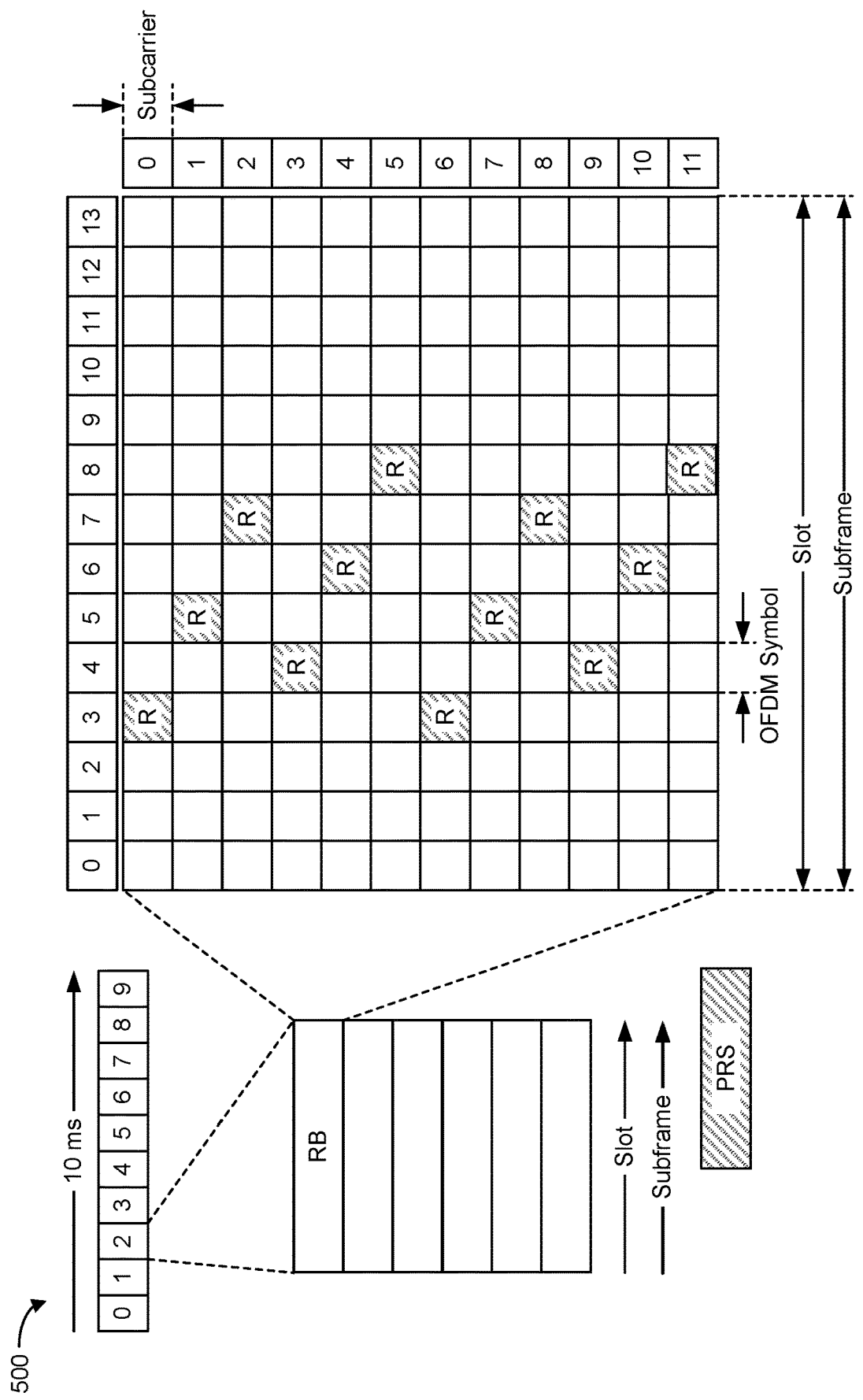
FIGS. 5A to 5D are diagrams illustrating example frame structures and channels within the frame structures, according to aspects of the disclosure.
Figure 5B:
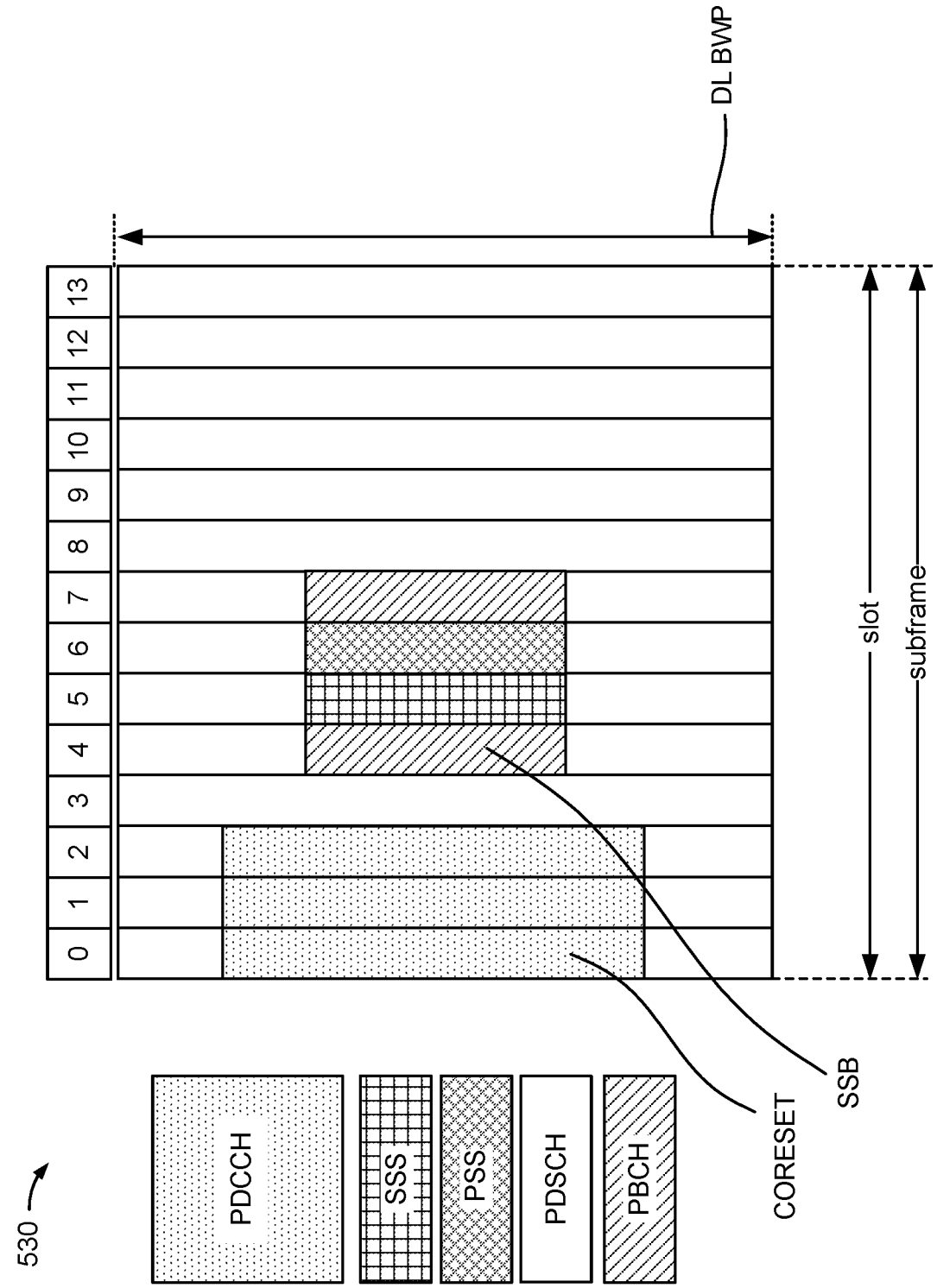
Figure 5C:
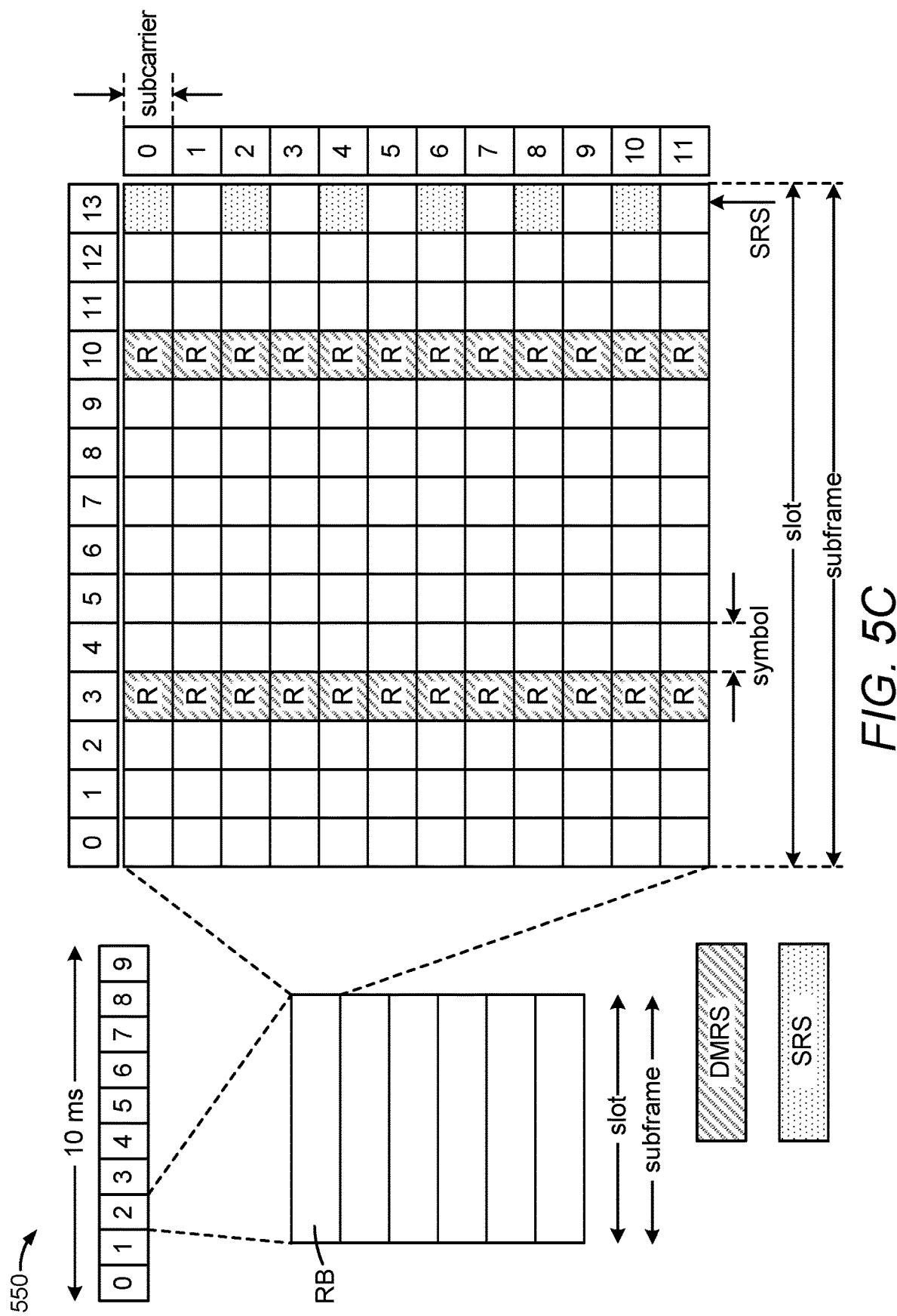
Figure 5D:
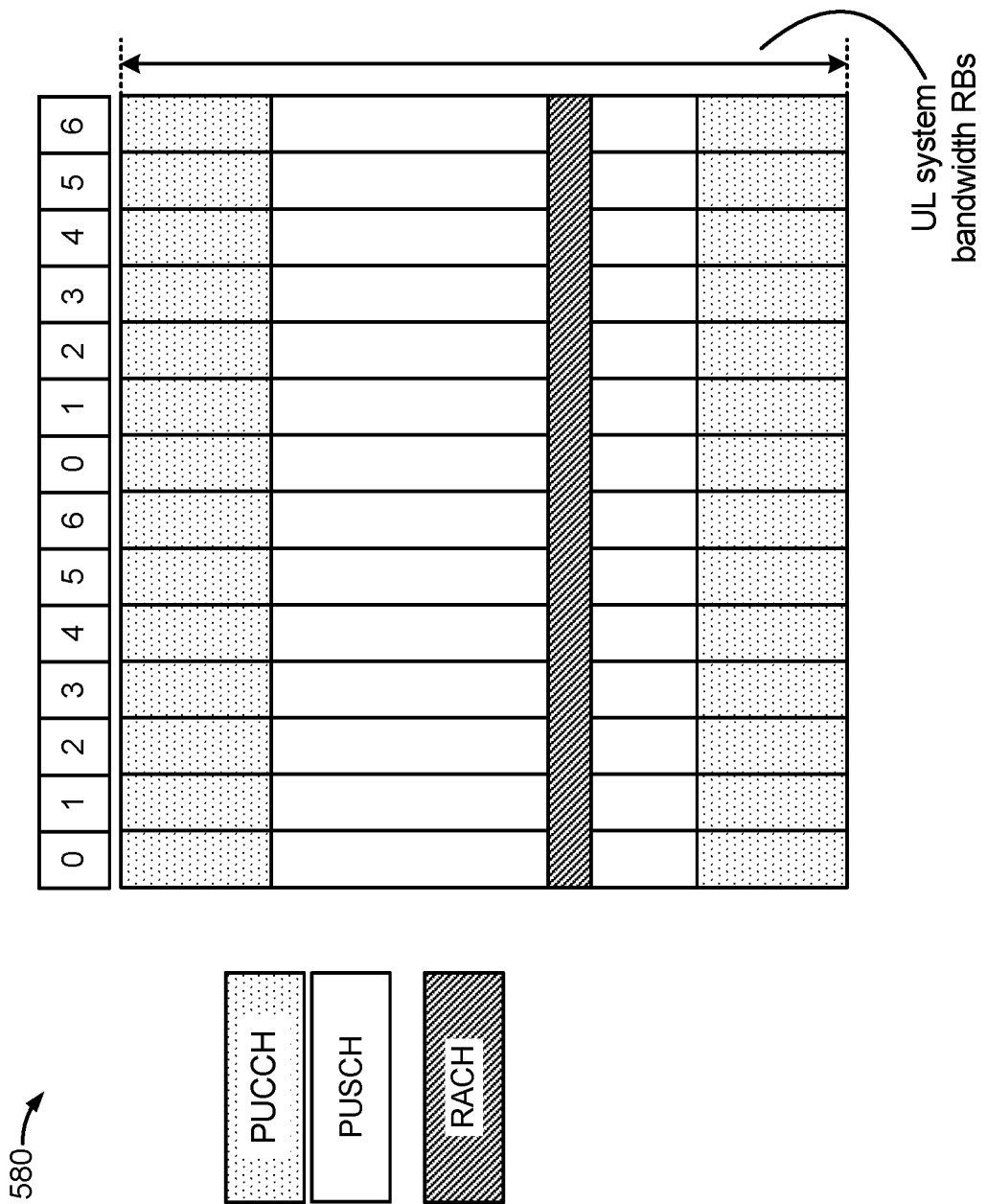

Various frame structures may be used to support downlink and uplink transmissions between network nodes (e.g., base stations and UEs). FIG. 5A is a diagram 500 illustrating an example of a downlink frame structure, according to aspects of the disclosure. FIG. 5B is a diagram 530 illustrating an example of channels within the downlink frame structure, according to aspects of the disclosure. FIG. 5C is a diagram 550 illustrating an example of an uplink frame structure, according to aspects of the disclosure. FIG. 5D is a diagram 570 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 5A to 5D, a numerology of 15 kHz is used. Thus, in the time domain, a 10 ms frame is divided into 10 equally sized subframes of 1 ms each, and each subframe includes one time slot. In FIGS. 5A to 5D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 5A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL PRS. FIG. 5A illustrates an example PRS resource configuration for comb-6 (which spans six symbols). That is, the locations of the shaded REs (labeled "R") indicate a comb-6 PRS resource configuration.

Currently, a DL PRS resource may span 2, 4, 6, or 12 consecutive symbols within a slot with a fully frequency-domain staggered pattern. A DL PRS resource can be configured in any higher layer configured downlink or flexible (FL) symbol of a slot. There may be a constant energy per resource element (EPRE) for all REs of a given DL PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu *\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

DL PRS resource IDs are locally defined within a DL PRS resource set, and DL PRS resource set IDs are locally defined within a TRP. To uniquely identify a DL PRS resource across TRPs, an ID has been defined that can be associated with multiple DL PRS resource sets associated with a single TRP. This ID can be used along with a DL PRS resource set ID and a DL PRS resource ID to uniquely identify a single DL PRS resource. This ID is referred to herein as "DL-PRS-TRP-ResourceSetId." Each TRP should only be associated with one "DL-PRS-TRP-ResourceSetId." For example, a "DL-PRS-TRP-ResourceSetId" may be a cell ID (e.g., PCI, VCI), or a TRP ID, or another identifier that is different than the cell ID or the TRP ID that is used for positioning purposes to participate in the unique identification of a PRS resource.

FIG. 5B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 5C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 5C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: $\{0\}$; 2-symbol comb-2: $\{0, 1\}$; 4-symbol comb-2: $\{0, 1, 0, 1\}$; 4-symbol comb-4: $\{0, 2, 1, 3\}$; 8-symbol comb-4: $\{0, 2, 1, 3, 0, 2, 1, 3\}$; 12-symbol comb-4: $\{0, 2, 1, 3, 0, 2, 1, 3, 0, 2, 1, 3\}$; 4-symbol comb-8: $\{0, 4, 2, 6\}$; 8-symbol comb-8: $\{0, 4, 2, 6, 1, 5, 3, 7\}$; and 12-symbol comb-8: $\{0, 4, 2, 6, 1, 5, 3, 7, 0, 4, 2, 6\}$.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS also can be used as uplink positioning reference signals for uplink positioning procedures, such as UL-TDOA, multi-RTT, DL-AoA, etc.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for uplink angle-of-arrival (UL-AoA). All of these are features that are additional to the current SRS framework, which is configured through RRC higher layer signaling (and potentially triggered or activated through MAC control element (CE) or DCI).

FIG. 5D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS" or "DL PRS," and an uplink positioning reference signal (e.g., an SRS-for-positioning, PTRS) may be referred to as an "UL-PRS" or "UL PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Referring further to SRS-for-positioning, SRS-for-positioning may support a semi-persistent (SP) configuration with MAC control element (MAC-CE) activation and/or deactivation. In contrast, aperiodic SRS-for-positioning are triggered by DCI.

For SRS-for-positioning, if the "SpatialRelationInfo" or "PathLossReference" parameters for an SRS indicate a DL-PRS, the following parameters of the DL-PRS are provided in the SRS-for-positioning configuration: (1) the identifier (ID) that can be associated with multiple DL PRS resource sets associated with a single TRP, (2) "DL-PRS-ResourceSetId," and (3) "DL-PRS-ResourceId." If the "SpatialRelationInfo" parameter indicates an SRS resource, the following parameters for the SRS-for-positioning can be provided: (1) "SRS-ResourceId," (2) uplink BWP ID, and (3) serving cell ID.

The maximum number of supported SRS-for-positioning resource sets depends on the capabilities of a UE, and may be up to 16 SRS resource sets per BWP. Currently, the values for the UE capability are selected from the set of {1, 16}, meaning a UE can either support one SRS resource set per BWP or 16 SRS resource sets per BWP.

As noted above, the configuration of an aperiodic SRS-for-positioning may occur via RRC, as defined in 3GPP Technical Specification (TS) 38.331, which is publicly available and incorporated herein by reference in its entirety. An SRS configuration is defined per BWP, as illustrated in FIG. 6A. Specifically, the illustrated "BWP-UplinkDedicated" information element (IE) 600 includes an "srs-Config" parameter pointing to a particular "srs-Config" IE. Inside an "srs-Config" IE, SRS resource sets and/or SRS resources are configured as illustrated in FIG. 6B. Specifically, an "srs-Config" IE 650 includes an "srs-ResourceID" parameter and a "spatialRelationInfo" parameter (which points to an "SRS-SpatialRelationInfo" IE).

As noted above, the network may activate and deactivate configured SP SRS resource sets of a serving cell by sending an SP SRS activation/deactivation MAC-CE. If the MAC entity (e.g., MAC layer 425) receives an SP SRS activation/deactivation MAC-CE on a serving cell, it is to indicate to lower layers the information regarding the SP SRS activation/deactivation MAC-CE. The configured SP SRS resource sets are initially deactivated upon configuration and after a handover.

An SP SRS activation/deactivation MAC-CE is identified by a MAC subheader with a logical channel identifier (LCID). The LCID identifies the logical channel instance of the corresponding MAC SDU or the type of the corresponding MAC-CE or padding for the downlink shared channel (DL-SCH) and the uplink shared channel (UL-SCH), respectively. There is one LCID field per MAC subheader.

Figure 7:
FIG. 7 illustrates various fields of a semi-persistent (SP) SRS activation/deactivation medium access control control element (MAC-CE).

FIG. 7 illustrates various fields of an SP SRS activation/deactivation MAC-CE 700. As shown in FIG. 7, an SP SRS activation/deactivation MAC-CE, such as MAC-CE 700, comprises an array of 8-bit octets. Thus, each row illustrated in FIG. 7 represents eight bits, and bit locations are indicated by the vertical hash marks at the top of the MAC-CE 700. The length of the MAC-CE 700 is 'N' octets.

An "A/D" field ("A" for "activation," "D" for "deactivation") in the first octet (labelled "Oct 1") indicates whether to activate or deactivate an indicated SP SRS resource set. The field may be set to '1' to indicate activation, otherwise it indicates deactivation. The purpose of this field is simply to activate or deactivate an SP SRS resource set.

An "SRS Resource Set's Cell ID" field in the first octet indicates the identity of the serving cell that contains the activated/deactivated SP SRS resource set. If the "C" field in the second octet (labelled "Oct 2") of the MAC-CE 700 is set to '0,' this field also indicates the identity of the serving cell that contains all resources indicated by the "Resource ID," fields. The purpose of this field is to identify the component carrier of the SP SRS. This field/value is generally needed because the SRS resource sets IDs are unique within the context of a BWP of a component carrier, that is, within a list of {cell ID, BWP ID, resource set ID} tuples. As shown in FIG. 7, the length of this field is five bits.

An "SRS Resource Set's BWP ID" field in the first octet indicates an uplink BWP as the code point of the DCI BWP indicator field (specified in 3GPP TS 38.212, which is publicly available and incorporated herein by reference in its entirety), which contains the activated/deactivated SP SRS resource set. If the "C" field in the second octet is set to '0,' this field also indicates the identity of the BWP that contains all resources indicated by the "Resource ID," fields. The purpose of this field is to identify the component carrier of the SP SRS. This field/value is generally needed because the SRS resource sets IDs are unique within the context of a BWP of a component carrier, that is, within a list of {cell ID, BWP ID, resource set ID} tuples. As shown in FIG. 7, the length of this field is two bits.

The "C" field in the second octet indicates whether the octets containing the "Resource Serving Cell ID" field(s) and "Resource BWP ID" field(s) are present. If this field is set to '1,' the octets containing the "Resource Serving Cell ID" field(s) and "Resource BWP ID" field(s) are present, otherwise, they are not present.

An "SUL" field in the second octet indicates whether the MAC-CE 700 applies to the normal uplink (NUL) carrier or the supplemental uplink (SUL) carrier configuration. This field may be set to '1' to indicate that it applies to the SUL carrier configuration, and may be set to '0' to indicate that it applies to the NUL carrier configuration. That is, this field is an indicator that the SRS that is being activated or deactivated is in the SUL carrier.

An "SP SRS Resource Set ID" field in the second octet indicates the SP SRS resource set ID identified by "SRS-ResourceSetId" that is to be activated or deactivated. As shown in FIG. 7, the length of this field is four bits.

An "$F_i$" field in the third octet indicates the type of resource used as a spatial relationship for an SRS resource within the SP SRS resource set indicated by the "SP SRS resource set ID" field. $F_0$ refers to the first SRS resource within the resource set, $F_1$ to the second one, and so on. The field can be set to '1' to indicate that a non-zero power (NZP) CSI-RS resource index is used, and can be set to '0' to indicate that either an SSB index or an SRS resource index is used. As shown in FIG. 7, the length of the field is one bit. This field is present if the MAC-CE 700 is used for activation, that is, if the A/D field is set to '1.'

A "Resource $ID_i$" field in the third octet contains an identifier of the resource used for spatial relationship determination for SRS resource i. Resource $ID_0$ refers to the first SRS resource within the resource set, resource $ID_1$ refers to the second, one and so on. If $F_i$ is set to '0' and the first bit of this field is set to '1,' the remainder of this field contains the value of "SSB-Index," specified in 3GPP TS 38.331. If $F_i$ is set to '0' and the first bit of this field is set to '0,' the remainder of this field contains the value of "SRS-ResourceId," specified in 3GPP TS 38.331. As shown in FIG. 7, the length of the field is seven bits. This field is present if the MAC-CE 700 is used for activation, that is, the A/D field is set to '1.'

A "Resource Serving Cell ID," field indicates the identity of the serving cell on which the resource used for spatial relationship determination for SRS resource i is located. That is, this field indicates the component carrier ID of the SRS or CSI-RS used for the spatial relation. As shown in FIG. 7, the length of the field is five bits.

A "Resource BWP ID," field indicates an uplink BWP as the code point of the DCI BWP indicator field (specified in 3GPP TS 38.212) on which the resource used for spatial relationship determination for SRS resource i is located. That is, this field indicates the BWP ID of the SRS used for the spatial relation. As shown in FIG. 7, the length of this field is two bits.

An "R" field in the various octets of the MAC-CE 700 indicate reserved bits. These bits are currently not used and therefore set to '0.'

The MAC-CE 700 is currently used for activating and deactivating an SP SRS-for-communication. The present disclosure provides techniques to reuse an SP SRS activation/deactivation MAC-CE (e.g., MAC-CE 700) for SP SRS-for-positioning, as opposed to activating and deactivating an SP SRS-for-communication. In an aspect, the network may activate and deactivate the configured SP SRS-for-positioning resource sets of a serving cell by sending an SP SRS-for-positioning activation/deactivation MAC-CE. The configured SP SRS-for-positioning resource sets may be deactivated initially upon configuration and after a handover.

SRS-for-communication are SRS resources that are used for the purpose of uplink or downlink data transfer/communication. For example, in 5G NR, these are resources that are associated with the usage of uplink codebook-based, uplink non-codebook-based, antenna switching or downlink CSI acquisition, or uplink beam management. In contrast, SRS-for-positioning are a collection of SRS resources configured for the purpose of the receiver of those resources being able to perform positioning measurements (e.g., received time of arrival (RTOA), UL-AoA, UL-RSRP) on those SRS resource. These resources are configured in higher layers using a separate information element field.

As noted above, the "SpatialRelationInfo" parameter may be configured per SRS resource. For SRS-for-positioning, if $F_i=0$, then for the ith SRS resource, an SSB ID is provided in the Resource $ID_i$ field as the spatial relation. If $F_i=1$, then for the ith SRS resource, a CSI-RS ID is provided in the Resource $ID_i$ field as the spatial relation. These are the second and third cases in table 800 of FIG. 8 below. In the case of an SSB, the "DL-PRS-TRP-ResourceSetId" parameter may need to be added as a separate field to select the associated TRP. In the present disclosure, for SRS-for-positioning, the spatial relation could also come from an SRS-for-positioning resource or a DL PRS resource. These are the fourth and fifth cases in table 800 of FIG. 8. If an SRS-for-positioning resource is used, there needs to be a way to select either an SRS-for-communication or an SRS-for-positioning. If a DL PRS resource is used, a PRS resource ID, a PRS resource set ID, and a "DL-PRS-TRP-ResourceSetId" would need to be added.

Further, the SP SRS Resource Set ID field in an SP SRS activation/deactivation MAC-CE needs to point to a new RRC information element that is defined for an SRS-for-positioning resource set. As noted above, the SP SRS Resource Set ID field has a length of four bits. Four bits is sufficient for this new purpose since there may be up to 16 SRS resource sets per BWP. The reserved bit (in the "R" field) could be used for the purpose of switching this interpretation "ON." That is, if the R-bit is '1,' it would indicate that the SP SRS activation/deactivation MAC-CE is indicating the spatial relation source for an SP SRS-for-positioning resource set.

There are five different cases for a QCL source reference signals (i.e., five types of spatial relation reference signals) for each SP SRS-for-positioning resource/resource set. FIG. 8 is a table 800 defining the five cases and the number of bits needed for each case. As shown in FIG. 8, in the first case ("Case 1"), the QCL source for each SP SRS-for-positioning resource is an SRS-for-communication resource (e.g., an SRS resource for uplink channel quality estimation). This case needs six bits to signal the SRS-for-communication resource, as there may be up to 64 (2—6) SRS-for-communication resources per BWP, and the BWP ID is provided separately.

In the second case ("Case 2"), the QCL source reference signal for each SP SRS-for-positioning resource is an SSB, identified by an SSB ID and the PCI for the SSB. Six bits are needed to signal an SSB ID because there may be up to 64 SSB ID resources per component carrier (CC). 10 bits are needed for the PCI because a PCI is a 10-bit value.

In the third case ("Case 3"), the QCL source reference signal for each SP SRS-for-positioning resource is a CSI-RS resource, identified by a CSI-RS resource ID. This case needs eight bits to signal the CSI-RS resource ID, as there may be up to 192 CSI-RS resources ($2^7 < 192 < 2^8$).

In the fourth case ("Case 4"), the QCL source reference signal for each SP SRS-for-positioning resource may be another SRS-for-positioning resource or an SRS-for communication resource, identified by an SRS resource ID. This case needs six bits to signal the SRS-for-positioning resource, as there may be up to 64 SRS-for-positioning resources per BWP, and the BWP ID is provided separately.

In the fifth case ("Case 5"), the QCL source for each SP SRS-for-positioning resource is a DL PRS resource of a given DL PRS resource set of a given TRP. Six bits are needed for a DL PRS resource ID. Three bits are needed for a DL PRS resource set ID, as there may be up to two DL PRS resource sets per frequency layer (FL) per TRP. Eight bits are needed for a TRP ID (which may also be referred to as a PRS ID, and which is different than a PRS resource ID and PCI), as there may be up to 256 ($2^8$) TRPs across all frequency layers per UE.

FIG. 9 is a table 900 defining the five cases in FIG. 8 and the number of bits needed to identify the QCL source reference signal for each case. The number of bits for the first, third, and fourth cases are the same as in table 800 of FIG. 8. However, for the second case, to uniquely identify an SSB, both the six bits of the SSB ID and the 10 bits of the PCI for the SSB are needed, resulting in a 16-bit field. In the fifth case, to uniquely identify a DL PRS resource, the six bits for the DL PRS resource ID, the three bits for the DL PRS resource set ID, and the eight bits for the TRP ID are needed, resulting in a 17-bit field.

In order to reuse the current SP SRS activation/deactivation MAC-CE to signal the QCL source for an SP SRS-for-positioning, various changes can be made. First, the reserved bit (in the R field) can be used to indicate that the SP SRS activation/deactivation MAC-CE indicates the QCL source reference signal for an SP SRS-for-positioning resource set. Second, the $F_i$ and Resource $ID_i$ fields can be reinterpreted, providing up to 128 bits (one bit for the $F_i$ field plus seven bits for the Resource $ID_i$ field times 16, the number of SRS resources in an SRS resource set, i.e., $(1+7)*16=128$) to signal the QCL source cases in table 900 of FIG. 9.

The present disclosure provides techniques for indicating or identifying the QCL source reference signal for a configured SP SRS-for-positioning resource/resource set. As a first option, for each SP SRS-for-positioning resource or resource set, the QCL case number (from the first column of table 900 in FIG. 9) is configured at the RRC layer and is not changed with an SP SRS activation/deactivation MAC-CE. In that case, the eight bits of the $F_i$ and Resource $ID_i$ fields can be interpreted as follows. For the second case (SSB as the QCL source, needing 16 bits), a table can be configured at the RRC layer that contains 256 entries, each entry containing a 16-bit string identifying a particular SSB ID plus the PCI for the SSB. The eight bits of the combined $F_i$ and Resource $ID_i$ fields of an SP SRS activation/deactivation MAC-CE can then carry an index, or hash value, into that table ($2^8=256$). Similarly, for the fifth case (DL PRS resource as the QCL source, needing 17 bits), a table can be configured at the RRC layer that contains 256 entries, each entry containing a 17-bit string identifying a particular DL PRS resource ID of a particular PRS resource set of a particular TRP. The eight bits of the combined $F_i$ and Resource $ID_i$ fields can then carry an index, or hash value, into that table. For the first, third, and fourth cases, the eight bits of the combined $F_i$ and Resource $ID_i$ fields can be used to identify the corresponding reference signal directly.

As a second option, if the first bit of the $F_i$ and Resource $ID_i$ fields is '0,' then either of the first and fourth cases may be indicated, and if the second bit is '0,' then the first case may be indicated, otherwise, if the second bit is '1,' then the fourth case may be indicated. As will be appreciated, the foregoing bit configuration is merely an example, and other bit configurations could be used to distinguish between the first and fourth cases. The remaining six bits of the combined $F_i$ and Resource $ID_i$ fields can be used to identify the reference signal (SRS-for-communication or SRS-for-positioning) to be used as the QCL source for the SP SRS-for-positioning resource or resource set. However, if the first bit of the $F_i$ and Resource $ID_i$ fields is '1,' then one of the second, third, or fifth cases is indicated. In this case, a table can be configured at the RRC layer for each of these case numbers that contains 128 ($2^7=128$) entries each. Then, for each SP SRS-for-positioning resource or resource set, which one of the case numbers (second, third, or fifth) to be used can be configured at the RRC layer (e.g., RRC layer 445), and the remaining seven bits of the combined $F_i$ and Resource $ID_i$ fields can be used to select one of the entries, and therefore QCL source reference signal, in the corresponding RRC-configured table.

As a third option, a 256-entry table for 256 possible QCL source reference signals can be configured at the RRC layer. Each of the 256 entries (rows) includes a first field for the QCL case number (1-5) and a second field identifying the QCL source reference signal (e.g., SSB, PCI, SRS-for-communication, etc.). The 256 entries may be divided equally (or as equally as possible) between the five QCL cases, or some cases may be preferred over others and therefore have more entries than others. A single 256-entry table means that all SP SRS-for-positioning resources, all SP SRS-for-positioning resource sets, all BWPs, or all component carriers associated with the same base station would use the same table, thereby reducing overhead. However, it also means that an SP SRS activation/deactivation MAC-CE can directly select the QCL case. There are four sub-options.

As a first sub-option, for each SP SRS-for-positioning resource, a table with 256 entries can be configured at the RRC layer. Each entry (row) would contain a case number (1, 2, 3, 4, or 5) plus the fields to select/identify a particular reference signal (e.g., SSB, PCI, SRS-for-positioning, etc.) as the QCL source for the SP SRS-for-positioning resource. Then, the eight bits in the $F_i$ and Resource $ID_i$ fields of an SP SRS activation/deactivation MAC-CE can be used to select a particular row, and therefore QCL source reference signal, from the table for each SP SRS-for-positioning resource.

As a second sub-option, for each SP SRS-for-positioning resource set, a table with 256 entries can be configured at the RRC layer. Each entry in the table would contain a case number (1, 2, 3, 4, or 5) plus the fields to select/identify a particular reference signal (e.g., SSB, PCI, SRS-for-positioning, etc.) as the QCL source for the SP SRS-for-positioning resource set. Then, the eight bits in the combined $F_i$ and Resource $ID_i$ fields of an SP SRS activation/deactivation MAC-CE can be used to select a particular row, and therefore QCL source reference signal, from the table for each SP SRS-for-positioning resource set.

As a third sub-option, for each BWP used by the UE (or the base station), a table with 256 entries can be configured at the RRC layer. Each entry would contain a case number (1, 2, 3, 4, or 5) plus the fields to select/identify a particular reference signal (e.g., SSB, PCI, SRS-for-positioning, etc.) as the QCL source for the SP SRS-for-positioning resources/resource sets configured in that BWP. Then, the eight bits in the combined $F_i$ and Resource $ID_i$ fields of an SP SRS activation/deactivation MAC-CE can be used to select a particular row, and therefore QCL source reference signal, from the table for each BWP.

As a fourth sub-option, for each component carrier used by the UE (or the base station), a table with 256 entries can be configured at the RRC layer. Each entry in the table would contain a case number (1, 2, 3, 4, or 5) plus the fields to select/identify a particular reference signal (e.g., SSB, PCI, SRS-for-positioning, etc.) as the QCL source for the SRS-for-positioning resources/resource sets configured in that component carrier. Then, the eight bits in the combined $F_i$ and Resource $ID_i$ fields of an SP SRS activation/deactivation MAC-CE can be used to select a particular row, and therefore QCL source reference signal, from the table for each component carrier.

As a fourth option, if an SP SRS-for-positioning resource or resource set is to use an SSB or DL PRS as the QCL source reference signal (the second and fifth cases in table 900 of FIG. 9), the SP SRS-for-positioning resource/resource set can be configured with the QCL source reference signal at the RRC layer. For these cases, there is no option for an update via SP SRS activation/deactivation MAC-CE. In contrast, for the first, third, and fourth cases, if the first bit of the $F_i$ and Resource $ID_i$ fields is '0,' then the first or fourth cases are indicated, and if the second bit is '0,' then the first case is indicated, otherwise, if the second bit is '1,' the fourth case is indicated. As will be appreciated, the foregoing bit configuration is merely an example, and other bit configurations could be used to distinguish between the first and fourth cases. The remaining six bits of the combined $F_i$ and Resource $ID_i$ fields can then be used to identify the QCL source reference signal (an SRS-for-positioning or an SRS-for-communication). If the first bit of the combined $F_i$ and Resource $ID_i$ fields is '1,' it means the third case is indicated. Note that in this case, only the first 128 resources can be indicated by the remaining seven bits, or another RRC table or another bit would need to be provided to map the seven bits up to a full 256 resources.

As a fifth option, an SP SRS-for-positioning activation/deactivation MAC-CE can be used to select a QCL case (1-5) and the QCL source reference signal. An SP SRS-for-positioning activation/deactivation MAC-CE may be identified by a MAC subheader with LCD. It may have a variable size, depending on the fields included.

Figure 10:
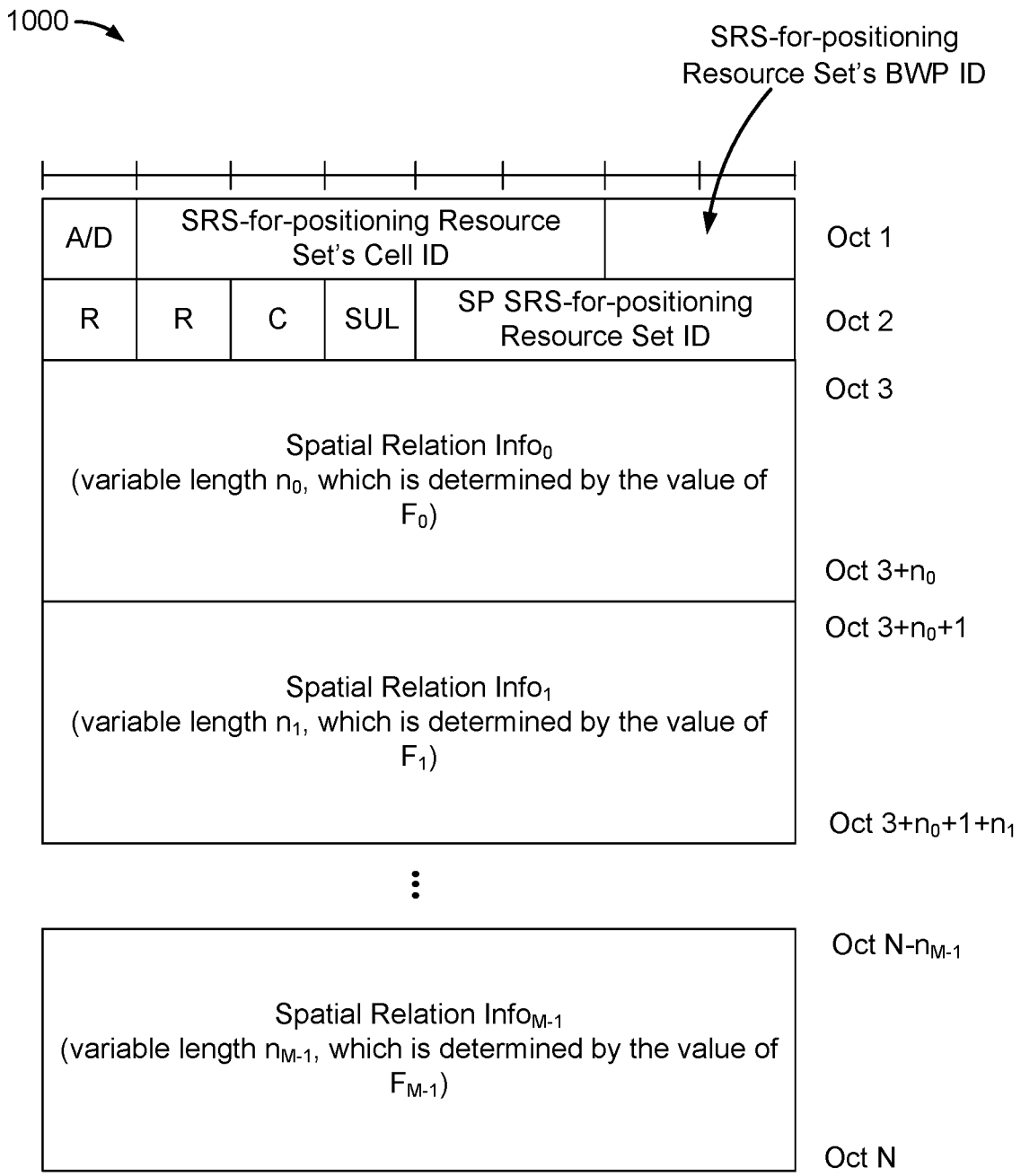
FIG. 10 illustrates various fields of an SP SRS-for-positioning activation/deactivation MAC-CE, according to aspects of the disclosure.

FIG. 10 illustrates the fields of an SP SRS-for-positioning activation/deactivation MAC-CE 1000, according to aspects of the disclosure. As shown in FIG. 10, an SP SRS-for-positioning activation/deactivation MAC-CE, such as MAC-CE 1000, comprises an array of 8-bit octets. Thus, each row illustrated in FIG. 10 represents eight bits, and bit locations are indicated by the vertical hash marks at the top of the MAC-CE 1000. The length of the MAC-CE 1000 is 'N' octets.

An "A/D" field in the first octet (labeled "Oct 1") indicates whether to activate or deactivate the indicated SP SRS-for-positioning resource set. The field is set to '1' to indicate activation, otherwise it indicates deactivation.

An "SRS-for-positioning Resource Set's Cell ID" field in the first octet indicates the identity of the serving cell that contains the activated/deactivated SP SRS-for-positioning resource set. If the "C" field is set to '0,' this field also indicates the identity of the serving cell that contains all resources indicated by the "Spatial Relation $Info_i$" fields. As shown in FIG. 10, the length of the field is five bits.

An "SRS-for-positioning Resource Set's BWP ID" field in the first octet indicates an uplink BWP as the code point of the DCI BWP indicator field (specified in 3GPP TS 38.212), which contains the activated/deactivated SP SRS-for-positioning resource set. If the "C" field is set to '0,' this field also indicates the identity of the BWP that contains all resources indicated by the Spatial Relation $Info_i$ fields. As shown in FIG. 10, the length of the field is two bits.

The "C" field in the second octet indicates whether the octet(s) containing the "Resource Serving Cell ID" field and the "Resource BWP ID" field in each Spatial Relation $Info_i$ field is present. If this field is set to '1,' the octets containing Resource Serving Cell ID field and Resource BWP ID field are present in each Spatial Relation $Info_i$ field, otherwise they are not present.

An "SUL" field in the second octet indicates whether the MAC-CE 1000 applies to the NUL carrier or the SUL carrier configuration. This field is set to '1' to indicate that it applies to the SUL carrier configuration and to '0' to indicate that it applies to the NUL carrier configuration.

An "SP SRS-for-positioning Resource Set ID" field in the second octet indicates the SP SRS-for-positioning resource set ID identified by "SRS-for-positioning-ResourceSetId," specified in 3GPP TS 38.331, which is to be activated or deactivated. As shown in FIG. 10, the length of the field is four bits.

The MAC-CE 1000 contains two "R" (reserved) bits, set to '0.' Note that because this is a new MAC-CE command, there is no need to differentiate it from other MAC-CE commands using the reserved bit.

A "Spatial Relation $Info_i$" field in the remaining octets of the MAC-CE 1000 contains the identifier of the resource used for spatial relationship determination for the SRS-for-positioning resource i, together with the identity of the serving cell and an uplink BWP as the code point of the DCI BWP indicator field (specified in 3GPP TS 38.212) on which the resource used for spatial relationship determination for the SRS-for-positioning resource i is located. Spatial relation $info_0$ refers to the first SRS-for-positioning resource within the resource set, spatial relation $info_1$ to the second one, and so on. This field has a variable size of $n_i$ octets, where $n_i$ is determined by the value of L and C. The octets 1 to $n_i-1$ of each Spatial Relation $Info_i$ field are only present if the MAC-CE 1000 is used for activation, i.e., the A/D field is set to '1.' A Spatial Relation $Info_i$ field (also referred to as a "spatial relation information field") has the following fields, as shown in FIGS. 11 to 15.

An "$F_i$" field indicates the type of resource used as the spatial relationship for the SRS-for-positioning resource within the SP SRS-for-positioning resource set indicated by the SP SRS-for-positioning Resource Set ID field. This field is part of the Spatial Relation $Info_i$ field, and therefore, does not appear in FIG. 10. FIGS. 11 to 15 show the Spatial Relation $Info_i$ fields for different values of $F_i$.

For the case that the value of the 3-bit $F_i$ field is '100' (FIG. 11), the Spatial Relation $Info_i$ fields 1100 contain the identifier of a DL PRS resource. If C=1, the length $n_i$ of the Spatial Relation $Info_i$ field 1100 is four octets, otherwise it is three octets. The "DL-PRS-ID" field in the third octet contains the "DL-PRS-ID" parameter specified in 3GPP TS 37.355 (which is publicly available and incorporated by reference herein in its entirety). The "DL PRS Resource Set ID" field in the first octet contains the "DL-PRS-ResourceSetID" parameter specified in 3GPP TS 37.355. The "DL PRS Resource ID" field in the second octet contains the "DL-PRS-ResourceID" parameter specified in 3GPP TS 37.355. The "Resource Serving Cell ID" field in the fourth octet indicates the identity of the serving cell on which the resource used for spatial relationship determination for the SRS-for-positioning resource is located. The "Resource BWP ID" field in the fourth octet indicates an uplink BWP as the code point of the DCI BWP indicator field, specified in 3GPP TS 38.212, on which the resource used for spatial relationship determination for the SRS-for-positioning resource is located.

For the case that the value of the 3-bit $F_i$ field is '011' (FIG. 12), the Spatial Relation Info$_i$ fields 1200 contain the identifier of an SRS-for-positioning resource. The length $n_i$ of the Spatial Relation Info$_i$ field 1200 is two octets. The "SRS-for-positioning Resource ID" field in the first octet contains the five least significant bits (LSBs) of the SRS-for-positioning resource ID specified in 3GPP TS 38.331. The "M" field in the second octet contains the most significant bit (MSB) of the SRS-for-positioning resource ID. The "Resource Serving Cell ID" field in the second octet indicates the identity of the serving cell on which the resource used for spatial relationship determination for the SRS-for-positioning resource is located. The resource BWP ID indicates an uplink BWP as the code point of the DCI BWP indicator field, specified in 3GPP TS 38.212, on which the resource used for spatial relationship determination for the SRS-for-positioning resource is located.

For the case that the value of the 3-bit $F_i$ field is '010' (FIG. 13), the Spatial Relation Info$_i$ fields 1300 contain the identifier of an NZP CSI-RS resource. If C=1, the length $n_i$ of the Spatial Relation Info$_i$ field 1300 is three octets, otherwise it is two octets. The "NZP CSI-RS Resource ID" field in the second octet contains the "NZP-CSI-RS-ResourceId" specified in 3GPP TS 38.331. The "Resource Serving Cell ID" field in the third octet indicates the identity of the serving cell on which the resource used for spatial relationship determination for the SRS-for-positioning resource is located. The resource BWP ID field indicates an uplink BWP as the code point of the DCI BWP indicator field, specified in 3GPP TS 38.212, on which the resource used for spatial relationship determination for the SRS-for-positioning resource is located.

For the case that the value of the 3-bit $F_i$ field is 001 (FIG. 14), the Spatial Relation Info$_i$ fields 1400 contain the identifier of an SSB. If C=1, the length $n_i$ of the Spatial Relation Info$_i$ field 1400 is four octets, otherwise it is three octets. The "SSB Index" field in the second octet contains the "SSB-Index" parameter specified in 3GPP TS 38.331. The "Physical Cell ID" field in the third octet contains the eight LSBs of the "PhysCellId" parameter for the SSB, specified in 3GPP TS 38.331. The "Physical Cell ID" field in the second octet contains the two MSBs of the "PhysCellId" parameter. The "Resource Serving Cell ID" field in the fourth octet indicates the identity of the serving cell on which the resource used for spatial relationship determination for the SRS-for-positioning resource is located. The "Resource BWP ID" field in the fourth octet indicates an uplink BWP as the code point of the DCI BWP indicator field, specified in 3GPP TS 38.212, on which the resource used for spatial relationship determination for the SRS-for-positioning resource is located.

For the case that the value of the 3-bit $F_i$ field is 000 (FIG. 15), the Spatial Relation Info$_i$ fields 1500 contain the identifier of an SRS resource(-for-communication). The length $n_i$ of the Spatial Relation Info$_i$ field 1500 is two octets. The "SRS Resource ID" field in the first octet contains the five LSBs of the SRS resource ID specified in 3GPP TS 38.331. The "M" field in the second octet contains the MSB of the SRS resource ID. The "Resource Serving Cell ID" field in the second octet indicates the identity of the serving cell on which the resource used for spatial relationship determination for the SRS-for-positioning resource is located. The "Resource BWP ID" field in the second octet indicates an uplink BWP as the codepoint of the DCI BWP indicator field, specified in 3GPP TS 38.212, on which the resource used for spatial relationship determination for the SRS-for-positioning resource is located.

In some cases, the Spatial Relation Info$_i$ field (or spatial relation information field) may be referred to as an "identifier field." In other cases, a combination of the $F_i$ field and the resource ID field (i.e., "DL PRS Resource ID," "SRS-for-positioning Resource ID," "NZP CSI-RS Resource ID," "SSB Index," "SRS Resource ID") may be referred to as an "identifier field," as these are the most significant fields (although not the only ones necessary) of the Spatial Relation Info$_i$ field in identifying the spatial relation reference signal.

Upon identifying the QCL source reference signal based on an SP SRS activation/deactivation MAC-CE (e.g., either as identified in the MAC-CE or in an entry of an RRC-configured table pointed to by the MAC-CE), a UE can transmit an SP SRS on the configured SRS resource(s)/resource set(s) using the QCL parameters (e.g., Doppler shift, Doppler spread, average delay, delay spread) of the QCL source reference signal.

Figure 16:
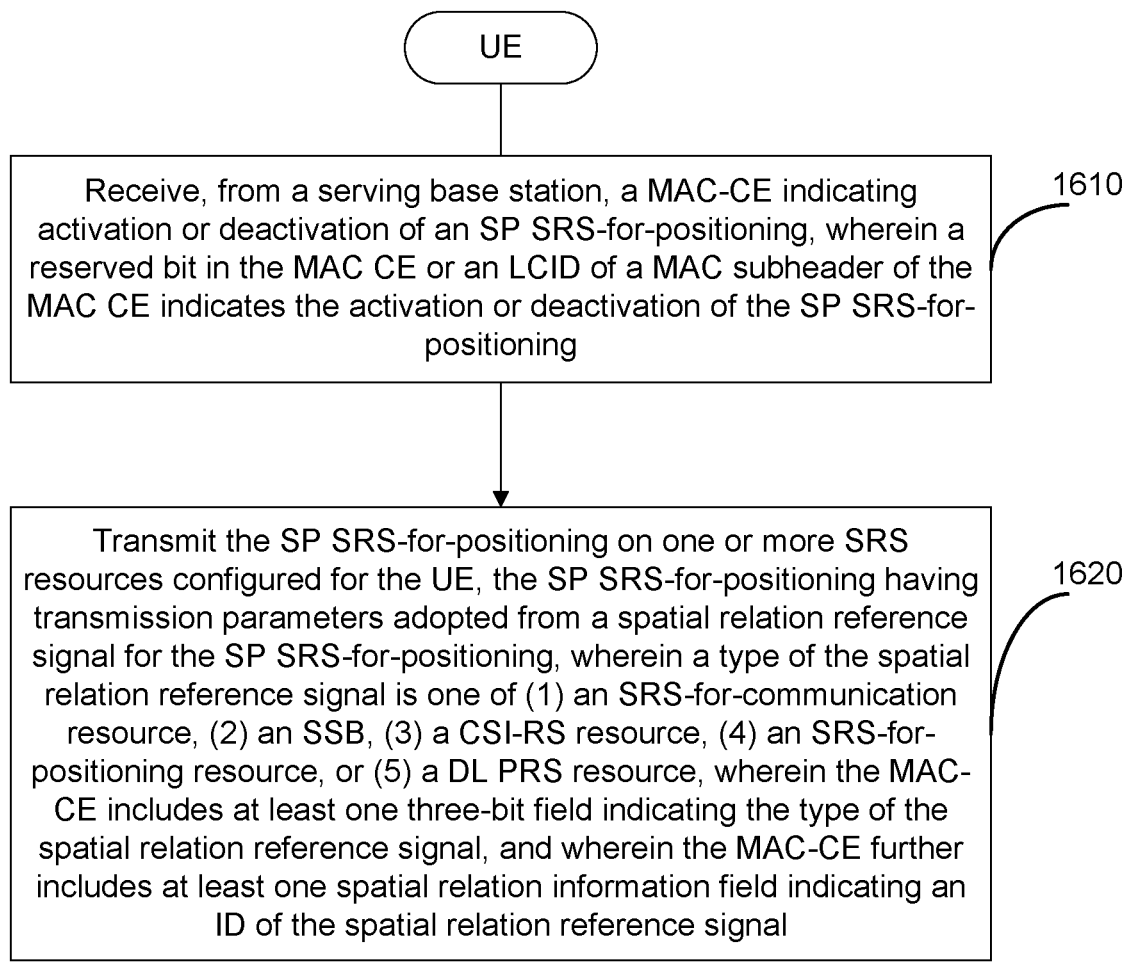
FIGS. 16 and 17 illustrate example methods of wireless communication, according to aspects of the disclosure.

FIG. 16 illustrates an example method 1600 of wireless communication, according to aspects of the disclosure. In an aspect, the method 1600 may be performed by a UE (e.g., any of the UEs described herein).

At 1610, the UE receives, from a serving base station (e.g., any of the base stations described herein), a MAC-CE indicating activation or deactivation of an SP SRS-for-positioning, wherein a reserved bit in the MAC-CE or an LCID of a MAC subheader of the MAC-CE indicates the activation or deactivation of the SP SRS-for-positioning. In an aspect, operation 1610 may be performed by WWAN transceiver 310, processing system 332, memory 340, and/or positioning component 342, any or all of which may be considered means for performing this operation.

At 1620, the UE transmits the SP SRS-for-positioning on one or more SRS resources configured for the UE, the SP SRS-for-positioning having transmission parameters adopted from a spatial relation reference signal for the SP SRS-for-positioning, an ID of the spatial relation reference signal determined based on an identifier field (e.g., at least the $F_i$ and resource ID (i.e., "DL PRS Resource ID," "SRS-for-positioning Resource ID," "NZP CSI-RS Resource ID," "SSB Index," "SRS Resource ID") fields of the Spatial Relation Info$_i$ field) for the spatial relation reference signal in the MAC-CE, wherein a type of the spatial relation reference signal is one of (1) an SRS-for-communication resource, (2) an SSB, (3) a CSI-RS resource, (4) an SRS-for-positioning resource, or (5) a DL PRS resource, and wherein the identifier field includes three bits (e.g., the $F_i$ field) indicating whether the type of the spatial relation reference signal is the SRS-for-communication resource, the SRS-for-positioning resource, the SSB, the CSI-RS resource, or the DL PRS resource. In an aspect, operation 1620 may be performed by WWAN transceiver 310, processing system 332, memory 340, and/or positioning component 342, any or all of which may be considered means for performing this operation.

Figure 17:
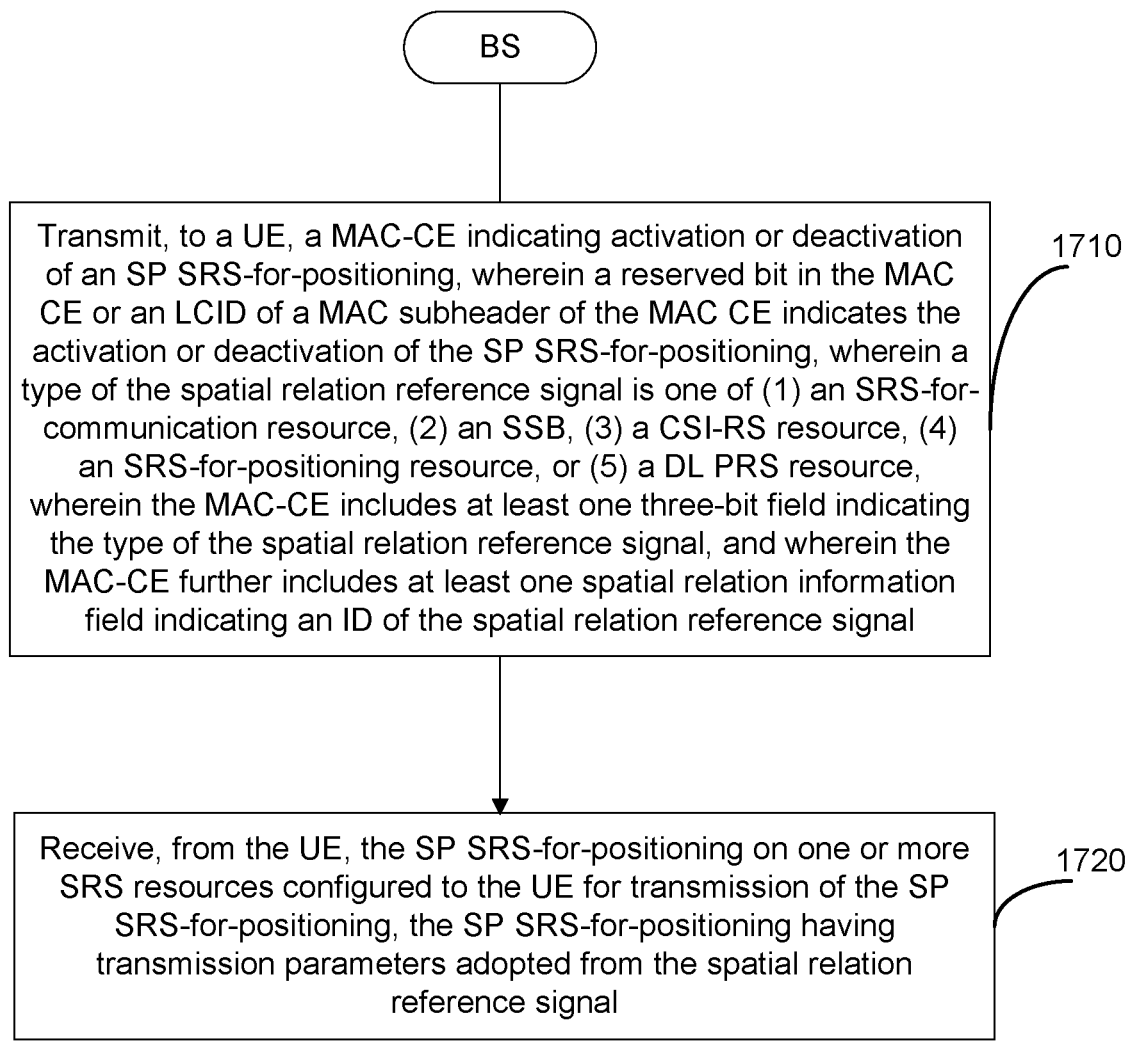

FIG. 17 illustrates an example method 1700 of wireless communication, according to aspects of the disclosure. In an aspect, method 1700 may be performed by a base station (e.g., any of the base stations described herein).

At 1710, the base station transmits, to a UE (e.g., any of the UEs described herein), a MAC-CE indicating activation or deactivation of an SP SRS-for-positioning, wherein a reserved bit in the MAC-CE or an LCD of a MAC subheader of the MAC-CE indicates the activation or deactivation of the SP SRS-for-positioning, wherein the MAC-CE includes an identifier field (e.g., at least the $F_i$ and resource ID (i.e., "DL PRS Resource ID," "SRS-for-positioning Resource ID," "NZP CSI-RS Resource ID," "SSB Index," "SRS Resource ID") fields of the Spatial Relation Info$_i$ field) from which an ID of a spatial relation reference signal for the SP SRS-for-positioning can be determined, wherein a type of the spatial relation reference signal is one of (1) an SRS-for-communication resource, (2) an SSB, (3) a CSI-RS resource, (4) an SRS-for-positioning resource, or (5) a DL PRS resource, and wherein the identifier field includes three bits (e.g., the $F_i$ field) indicating whether the type of the spatial relation reference signal is the SRS-for-communication resource, the SRS-for-positioning resource, the SSB, the CSI-RS resource, or the DL PRS resource. In an aspect, operation 1710 may be performed by WWAN transceiver 350, processing system 384, memory 386, and/or positioning component 388, any or all of which may be considered means for performing this operation.

At 1720, the base station receives, from the UE, the SP SRS-for-positioning on one or more SRS resources configured to the UE for transmission of the SP SRS-for-positioning, the SP SRS-for-positioning having transmission parameters adopted from the spatial relation reference signal. In an aspect, operation 1720 may be performed by WWAN transceiver 350, processing system 384, memory 386, and/or positioning component 388, any or all of which may be considered means for performing this operation.

As will be appreciated, technical advantages of using the same MAC-CE (the first through fourth options described herein) or a similar MAC-CE (the fifth option described herein) as a legacy MAC-CE SP-SRS activation/deactivation command include lower-complexity implementation, reuse of existing UE/gNB deployment, reduction of new deployment and testing costs, reduction of time-to-market of the new feature, and reduction of the time-to-standardization effort.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving, from a serving base station, a medium access control control element (MAC CE) indicating activation or deactivation of a semi-persistent (SP) sounding reference signal (SRS)-for-positioning, wherein a reserved bit in the MAC CE or a logical channel identifier (LCID) of a MAC subheader of the MAC CE indicates the activation or deactivation of the SP SRS-for-positioning; determining an identifier (ID) of a spatial relation reference signal for the SP SRS-for-positioning based on the MAC CE; and transmitting the SP SRS-for-positioning on one or more SRS resources configured to the UE for transmission of the SP SRS-for-positioning, the SP SRS-for-positioning having transmission parameters adopted from the spatial relation reference signal.

Clause 2. The method of clause 1, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource.

Clause 3. The method of clause 2, wherein: the SRS-for-communication resource is identified by a six-bit SRS resource ID, the SSB is identified by a 16-bit SSB ID and physical cell identity (PCI) of the SSB, the CSI-RS resource is identified by an eight-bit CSI-RS resource ID, the SRS-for-positioning resource is identified by a six-bit SRS resource ID, and the DL PRS resource is identified by a 17-bit DL PRS resource ID, DL PRS resource set ID, and transmission-reception point (TRP) ID.

Clause 4. The method of clause 3, wherein: the reserved bit in the MAC CE indicates the activation or deactivation of the SP SRS-for-positioning, and the MAC CE includes an eight-bit field from which the ID of the spatial relation reference signal can be determined.

Clause 5. The method of clause 4, further comprising: receiving, from the serving base station via radio resource control (RRC) signaling, an indication of the type of the spatial relation reference signal.

Clause 6. The method of clause 5, wherein, based on the type of the spatial relation reference signal, the eight-bit field includes: the SRS resource ID of the SRS-for-communication resource, an index value into a table of combinations of SSB IDs and PCIs, the CSI-RS resource ID, the SRS resource ID of the SRS-for-positioning resource, or an index value into a table of combinations of DL PRS resource IDs, DL PRS resource set IDs, and TRP IDs.

Clause 7. The method of clause 6, further comprising, based on the type of the spatial relation reference signal: receiving, from the serving base station, the table of combinations of SSB IDs and PCIs via RRC signaling; and/or receiving, from the serving base station, the table of combinations of DL PRS resource IDs, DL PRS resource set IDs, and TRP IDs via RRC signaling.

Clause 8. The method of any of clauses 4 to 7, wherein the eight-bit field includes: two bits indicating whether the type of the spatial relation reference signal is the SRS-for-communication resource or the SRS-for-positioning resource, and six bits for the SRS resource ID of the SRS-for-communication resource or the SRS resource ID of the SRS-for-positioning resource.

Clause 9. The method of clause 8, wherein the eight-bit field includes: one bit indicating whether the type of the spatial relation reference signal is the SSB, the CSI-RS resource, or the DL PRS resource, and a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

Clause 10. The method of clause 9, further comprising: receiving, from the serving base station, the table of combinations of SSB IDs and PCIs via RRC signaling; receiving, from the serving base station, the table of CSI-RS resource IDs via RRC signaling; and/or receiving, from the serving base station, the table of combinations of DL PRS resource IDs, DL PRS resource set IDs, and TRP IDs via RRC signaling.

Clause 11. The method of any of clauses 9 to 10, further comprising: receiving, from the serving base station via RRC signaling, an indication of whether the seven-bit index value points into the table of combinations of SSB IDs and PCIs, the table of CSI-RS resource IDs, or the table of combinations of DL PRS resource IDs, DL PRS resource set IDs, and TRP IDs.

Clause 12. The method of any of clauses 4 to 11, further comprising: receiving a table from the serving base station via RRC signaling, each entry of the table including the type of the spatial relation reference signal and an ID of a spatial relation reference signal.

Clause 13. The method of clause 12, wherein the table is for an SRS resource, an SRS resource set, a bandwidth part (BWP), or a component carrier for the SP SRS-for-positioning.

Clause 14. The method of any of clauses 12 to 13, wherein the eight-bit field includes the ID of the spatial relation reference signal.

Clause 15. The method of any of clauses 4 to 14, wherein the eight-bit field includes: two bits indicating whether the type of the spatial relation reference signal is the SRS-for-communication resource or the SRS-for-positioning resource, and six bits for the SRS resource ID of the SRS-for-communication resource or the SRS resource ID of the SRS-for-positioning resource.

Clause 16. The method of clause 4, wherein the eight-bit field includes: one bit indicating that the type of the spatial relation reference signal is the CSI-RS resource, and seven bits for the CSI-RS resource ID.

Clause 17. The method of clause 4, further comprising: receiving, from the serving base station via RRC signaling, a configuration of the type of the spatial relation reference signal as the SSB or the DL PRS resource.

Clause 18. The method of any of clauses 4 to 17, wherein the eight-bit field is a combination of an $F_i$ field having a length of one bit and a resource $ID_i$ field having a length of seven bits.

Clause 19. The method of any of clauses 3 to 18, wherein: the LCID indicates the activation or deactivation of the SP SRS-for-positioning, and the MAC CE includes at least one three-bit $F_i$ field identifying the type of the spatial relation reference signal and at least one spatial relation information field including the ID of the spatial relation reference signal.

Clause 20. The method of any of clauses 1 to 19, wherein the spatial relation reference signal is a quasi-colocation (QCL) source reference signal.

Clause 21. A method of wireless communication performed by a base station, comprising: transmitting, to a user equipment (UE), a medium access control control element (MAC CE) indicating activation or deactivation of a semi-persistent (SP) sounding reference signal (SRS)-for-positioning, wherein a reserved bit in the MAC CE or a logical channel identifier (LCD) of a MAC subheader of the MAC CE indicates the activation or deactivation of the SP SRS-for-positioning; and receiving, from the UE, the SP SRS-for-positioning on one or more SRS resources configured to the UE for transmission of the SP SRS-for-positioning, the SP SRS-for-positioning having transmission parameters adopted from a spatial relation reference signal determined from the MAC CE.

Clause 22. The method of clause 21, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource.

Clause 23. The method of clause 22, wherein: the SRS-for-communication resource is identified by a six-bit SRS resource identifier (ID), the SSB is identified by a 16-bit SSB ID and physical cell identity (PCI) of the SSB, the CSI-RS resource is identified by an eight-bit CSI-RS resource ID, the SRS-for-positioning resource is identified by a six-bit SRS resource identifier, and the DL PRS resource is identified by a 17-bit DL PRS resource ID, DL PRS resource set ID, and transmission-reception point (TRP) ID.

Clause 24. The method of clause 23, wherein: the reserved bit in the MAC CE indicates the activation or deactivation of the SP SRS-for-positioning, and the MAC CE includes an eight-bit field from which the ID of the spatial relation reference signal can be determined.

Clause 25. The method of clause 24, further comprising: transmitting, to the UE via radio resource control (RRC) signaling, an indication of the type of the spatial relation reference signal.

Clause 26. The method of clause 25, wherein, based on the type of the spatial relation reference signal, the eight-bit field includes: the SRS resource ID of the SRS-for-communication resource, an index value into a table of combinations of SSB IDs and PCIs, the CSI-RS resource ID, the SRS resource ID of the SRS-for-positioning resource, or an index value into a table of combinations of DL PRS resource IDs, DL PRS resource set IDs, and TRP IDs.

Clause 27. The method of clause 26, further comprising, based on the type of the spatial relation reference signal: transmitting, to the UE, the table of combinations of SSB IDs and PCIs via RRC signaling; and/or transmitting, to the UE, the table of combinations of DL PRS resource IDs, DL PRS resource set IDs, and TRP IDs via RRC signaling.

Clause 28. The method of any of clauses 24 to 27, wherein the eight-bit field includes: two bits indicating whether the type of the spatial relation reference signal is the SRS-for-communication resource or the SRS-for-positioning resource, and six bits for the SRS resource ID of the SRS-for-communication resource or the SRS resource ID of the SRS-for-positioning resource.

Clause 29. The method of clause 28, wherein the eight-bit field includes: one bit indicating whether the type of the spatial relation reference signal is the SSB, the CSI-RS resource, or the DL PRS resource, and a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

Clause 30. The method of clause 29, further comprising: transmitting, to the UE, the table of combinations of SSB IDs and PCIs via RRC signaling; transmitting, to the UE, the table of CSI-RS resource IDs via RRC signaling; and/or transmitting, to the UE, the table of combinations of DL PRS resource IDs, DL PRS resource set IDs, and TRP IDs via RRC signaling.

Clause 31. The method of any of clauses 29 to 30, further comprising: transmitting, to the UE via RRC signaling, an indication of whether the seven-bit index value points into the table of combinations of SSB IDs and PCIs, the table of CSI-RS resource IDs, or the table of combinations of DL PRS resource IDs, DL PRS resource set IDs, and TRP IDs.

Clause 32. The method of any of clauses 24 to 31, further comprising: transmitting a table to the UE via RRC signaling, each entry of the table including the type of the spatial relation reference signal and an ID of a spatial relation reference signal.

Clause 33. The method of clause 32, wherein the table is for an SRS resource, an SRS resource set, a bandwidth part (BWP), or a component carrier for the SP SRS-for-positioning.

Clause 34. The method of any of clauses 32 to 33, wherein the eight-bit field includes the ID of the spatial relation reference signal.

Clause 35. The method of any of clauses 24 to 34, wherein the eight-bit field includes: two bits indicating whether the type of the spatial relation reference signal is the SRS-for-communication resource or the SRS-for-positioning resource, and six bits for the SRS resource ID of the SRS-for-communication resource or the SRS resource ID of the SRS-for-positioning resource.

Clause 36. The method of clause 24, wherein the eight-bit field includes: one bit indicating that the type of the spatial relation reference signal is the CSI-RS resource, and seven bits for the CSI-RS resource ID.

Clause 37. The method of clause 24, further comprising: transmitting, to the UE via RRC signaling, a configuration of the type of the spatial relation reference signal as the SSB or the DL PRS resource.

Clause 38. The method of any of clauses 24 to 37, wherein the eight-bit field is a combination of an $F_i$ field having a length of one bit and a resource $ID_i$ field having a length of seven bits.

Clause 39. The method of any of clauses 23 to 38, wherein: the LCID indicates the activation or deactivation of the SP SRS-for-positioning, and the MAC CE includes at least one three-bit $F_i$ field identifying the type of the spatial relation reference signal and at least one spatial relation information field including the ID of the spatial relation reference signal.

Clause 40. The method of any of clauses 21 to 39, wherein the spatial relation reference signal is a quasi-colocation (QCL) source reference signal.

Clause 41. An apparatus comprising a memory and at least one processor communicatively coupled to the memory, the memory and the at least one processor configured to perform a method according to any of clauses 1 to 40.

Clause 42. An apparatus comprising means for performing a method according to any of clauses 1 to 40.

Clause 43. A non-transitory computer-readable medium storing computer-executable instructions, the computer-executable comprising at least one instruction for causing a computer or processor to perform a method according to any of clauses 1 to 40.

Additional implementation examples are described in the following numbered clauses Clause 1. A method of wireless communication performed by a user equipment (UE), comprising: receiving, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and transmitting the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field (e.g., at least the $F_i$ and resource ID (i.e., "DL PRS Resource ID," "SRS-for-positioning Resource ID," "NZP CSI-RS Resource ID," "SSB Index," "SRS Resource ID") fields of the Spatial Relation $Info_i$ field) for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits (e.g., the $F_i$ field) indicating whether the type of the spatial relation reference signal is the SRS-for-communication resource, the SRS-for-positioning resource, the SSB, the CSI-RS resource, or the DL PRS resource.

Clause 2. The method of clause 1, wherein the SRS-for-communication resource is identified by a five-bit SRS resource ID.

Clause 3. The method of any of clauses 1 to 2, wherein the SSB is identified by a 16-bit SSB ID and physical cell identity (PCI) of the SSB.

Clause 4. The method of any of clauses 1 to 3, wherein the CSI-RS resource is identified by an eight-bit CSI-RS resource ID.

Clause 5. The method of any of clauses 1 to 4, wherein the SRS-for-positioning resource is identified by a five-bit SRS resource ID.

Clause 6. The method of any of clauses 1 to 5, wherein the DL PRS resource is identified by a 17-bit DL PRS resource $ID_i$ DL PRS resource set $ID_i$ and transmission-reception point (TRP) ID.

Clause 7. The method of any of clauses 1 to 6, wherein, based on the type of the spatial relation reference signal, the identifier field includes: the SRS resource ID of the SRS-for-communication resource, an index value into a table of combinations of SSB IDs and PCIs, the CSI-RS resource $ID_i$ the SRS resource ID of the SRS-for-positioning resource, or an index value into a table of combinations of DL PRS resource IDs, DL PRS resource set IDs, and TRP IDs.

Clause 8. The method of clause 7, further comprising, based on the type of the spatial relation reference signal: receiving, from the serving base station, the table of combinations of SSB IDs and PCIs via radio resource control (RRC) signaling; and/or receiving, from the serving base station, the table of combinations of DL PRS resource IDs, DL PRS resource set IDs, and TRP IDs via RRC signaling.

Clause 9. The method of any of clauses 1 to 8, wherein the identifier field includes one or more bits indicating whether the type of the spatial relation reference signal is the SRS-for-communication resource or the SRS-for-positioning resource.

Clause 10. The method of clause 9, wherein the identifier field includes six bits for the SRS resource ID of the SRS-for-communication resource or the SRS resource ID of the SRS-for-positioning resource.

Clause 11. The method of clause 1, wherein the identifier field includes at least one bit indicating whether the type of the spatial relation reference signal is the SSB, the CSI-RS resource, the DL PRS resource, or an SRS resource.

Clause 12. The method of clause 11, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

Clause 13. The method of clause 12, further comprising: receiving, from the serving base station, the table of combinations of SSB IDs and PCIs via RRC signaling; receiving, from the serving base station, the table of CSI-RS resource IDs via RRC signaling; and/or receiving, from the serving base station, the table of combinations of DL PRS resource IDs, DL PRS resource set IDs, and TRP IDs via RRC signaling.

Clause 14. The method of any of clauses 1 to 13, further comprising: receiving a table from the serving base station via RRC signaling, each entry of the table including the type of the spatial relation reference signal and the ID of the spatial relation reference signal.

Clause 15. The method of clause 14, wherein the table is for an SRS resource, an SRS resource set, a bandwidth part (BWP), or a component carrier for the SP SRS-for-positioning.

Clause 16. The method of any of clauses 1 to 15, wherein the identifier field comprises an eight-bit field including the ID of the spatial relation reference signal.

Clause 17. The method of clause 1, further comprising: receiving, from the serving base station via RRC signaling, a configuration of the type of the spatial relation reference signal as the SSB or the DL PRS resource.

Clause 18. The method of any of clauses 1 to 17, wherein the eight-bit field is a combination of an $F_i$ field having a length of one bit and a resource $ID_i$ field having a length of seven bits.

Clause 19. The method of any of clauses 1 to 18, wherein: the LCID indicates the activation or deactivation of the SP SRS-for-positioning, and the MAC-CE includes at least one three-bit $F_i$ field identifying the type of the spatial relation reference signal and at least one spatial relation information field including the ID of the spatial relation reference signal.

Clause 20. The method of any of clauses 1 to 19, wherein the spatial relation reference signal is a quasi-colocation (QCL) source reference signal.

Clause 21. A method of wireless communication performed by a base station, comprising: transmitting, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning, wherein the MAC-CE includes an identifier field (e.g., at least the $F_i$ and resource ID (i.e., "DL PRS Resource ID," "SRS-for-positioning Resource ID," "NZP CSI-RS Resource ID," "SSB Index," "SRS Resource ID") fields of the Spatial Relation Info$_i$ field) from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits (e.g., the $F_i$ field) indicating whether the type of the spatial relation reference signal is the SRS-for-communication resource, the SRS-for-positioning resource, the SSB, the CSI-RS resource, or the DL PRS resource; and receiving, from the UE, the SP SRS-for-positioning on one or more SRS resources configured to the UE for transmission of the SP SRS-for-positioning, the SP SRS-for-positioning having transmission parameters adopted from the spatial relation reference signal.

Clause 22. The method of clause 21, wherein the SRS-for-communication resource is identified by a five-bit SRS resource identifier (ID).

Clause 23. The method of any of clauses 21 to 22, wherein the SSB is identified by a 16-bit SSB ID and physical cell identity (PCI) of the SSB.

Clause 24. The method of any of clauses 21 to 23, wherein the CSI-RS resource is identified by an eight-bit CSI-RS resource ID.

Clause 25. The method of any of clauses 21 to 24, wherein the SRS-for-positioning resource is identified by a five-bit SRS resource identifier.

Clause 26. The method of any of clauses 21 to 25, wherein the DL PRS resource is identified by a 17-bit DL PRS resource ID$_i$ DL PRS resource set ID$_i$ and transmission-reception point (TRP) ID.

Clause 27. The method of any of clauses 21 to 26, wherein, based on the type of the spatial relation reference signal, the identifier field includes: the SRS resource ID of the SRS-for-communication resource, an index value into a table of combinations of SSB IDs and PCIs, the CSI-RS resource ID$_i$ the SRS resource ID of the SRS-for-positioning resource, or an index value into a table of combinations of DL PRS resource IDs, DL PRS resource set IDs, and TRP IDs.

Clause 28. The method of clause 27, further comprising, based on the type of the spatial relation reference signal: transmitting, to the UE, the table of combinations of SSB IDs and PCIs via radio resource control (RRC) signaling; and/or transmitting, to the UE, the table of combinations of DL PRS resource IDs, DL PRS resource set IDs, and TRP IDs via RRC signaling.

Clause 29. The method of any of clauses 21 to 28, wherein the identifier field includes one or more bits indicating whether the type of the spatial relation reference signal is the SRS-for-communication resource or the SRS-for-positioning resource.

Clause 30. The method of clause 29, wherein the identifier field includes six bits for the SRS resource ID of the SRS-for-communication resource or the SRS resource ID of the SRS-for-positioning resource.

Clause 31. The method of clause 21, wherein the identifier field includes at least one bit indicating whether the type of the spatial relation reference signal is the SSB, the CSI-RS resource, the DL PRS resource, or an SRS resource.

Clause 32. The method of clause 31, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

Clause 33. The method of clause 32, further comprising: transmitting, to the UE, the table of combinations of SSB IDs and PCIs via RRC signaling; transmitting, to the UE, the table of CSI-RS resource IDs via RRC signaling; and/or transmitting, to the UE, the table of combinations of DL PRS resource IDs, DL PRS resource set IDs, and TRP IDs via RRC signaling.

Clause 34. The method of any of clauses 21 to 33, further comprising: transmitting a table to the UE via RRC signaling, each entry of the table including the type of the spatial relation reference signal and the ID of the spatial relation reference signal.

Clause 35. The method of clause 34, wherein the table is for an SRS resource, an SRS resource set, a bandwidth part (BWP), or a component carrier for the SP SRS-for-positioning.

Clause 36. The method of any of clauses 21 to 35, wherein the identifier field comprises an eight-bit field including the ID of the spatial relation reference signal.

Clause 37. The method of clause 21, further comprising: transmitting, to the UE via RRC signaling, a configuration of the type of the spatial relation reference signal as the SSB or the DL PRS resource.

Clause 38. The method of any of clauses 21 to 37, wherein the eight-bit field is a combination of an $F_i$ field having a length of one bit and a resource $ID_i$ field having a length of seven bits.

Clause 39. The method of any of clauses 21 to 38, wherein: the LCD indicates the activation or deactivation of the SP SRS-for-positioning, and the MAC-CE includes at least one three-bit $F_i$ field identifying the type of the spatial relation reference signal and at least one spatial relation information field including the ID of the spatial relation reference signal.

Clause 40. The method of any of clauses 21 to 39, wherein the spatial relation reference signal is a quasi-colocation (QCL) source reference signal.

Clause 41. An apparatus comprising a memory and at least one processor communicatively coupled to the memory, the memory and the at least one processor configured to perform a method according to any of clauses 1 to 40.

Clause 42. An apparatus comprising means for performing a method according to any of clauses 1 to 40.

Clause 43. A non-transitory computer-readable medium storing computer-executable instructions, the computer-executable comprising at least one instruction for causing a computer or processor to perform a method according to any of clauses 1 to 40.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
  receiving, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and
  transmitting the SP SRS-for-positioning on one or more SRS resources configured for the UE, the SP SRS-for-positioning having transmission parameters adopted from a spatial relation reference signal for the SP SRS-for-positioning, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, wherein the MAC-CE includes at least one three-bit field indicating the type of the spatial relation reference signal, and wherein the MAC-CE further includes at least one spatial relation information field indicating an identifier (ID) of the spatial relation reference signal.

2. The method of claim 1, wherein the SRS-for-communication resource is identified by a five-bit SRS resource ID.

3. The method of claim 1, wherein the SSB is identified by a 16-bit SSB ID and physical cell identity (PCI) of the SSB.

4. The method of claim 1, wherein the CSI-RS resource is identified by an eight-bit CSI-RS resource ID.

5. The method of claim 1, wherein the SRS-for-positioning resource is identified by a five-bit SRS resource ID.

6. The method of claim 1, wherein the DL PRS resource is identified by a 17-bit DL PRS resource ID, DL PRS resource set ID, and transmission-reception point (TRP) ID.

7. The method of claim 1, wherein, based on the type of the spatial relation reference signal, the identifier field includes:
  the SRS resource ID of the SRS-for-communication resource,
  an index value into a table of combinations of SSB IDs and PCIs,
  the CSI-RS resource ID,
  the SRS resource ID of the SRS-for-positioning resource, or
  an index value into a table of combinations of DL PRS resource IDs, DL PRS resource set IDs, and TRP IDs.

8. The method of claim 7, further comprising, based on the type of the spatial relation reference signal:
  receiving, from the serving base station, the table of combinations of SSB IDs and PCIs via radio resource control (RRC) signaling; and/or
  receiving, from the serving base station, the table of combinations of DL PRS resource IDs, DL PRS resource set IDs, and TRP IDs via RRC signaling.

9. The method of claim 1, wherein the identifier field includes one or more bits indicating whether the type of the spatial relation reference signal is the SRS-for-communication resource or the SRS-for-positioning resource.

10. The method of claim 9, wherein the identifier field includes six bits for the SRS resource ID of the SRS-for-communication resource or the SRS resource ID of the SRS-for-positioning resource.

11. The method of claim 1, wherein the identifier field includes at least one bit indicating whether the type of the spatial relation reference signal is the SSB, the CSI-RS resource, the DL PRS resource, or an SRS resource.

12. The method of claim 11, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

13. The method of claim 12, further comprising:
  receiving, from the serving base station, the table of combinations of SSB IDs and PCIs via RRC signaling;
  receiving, from the serving base station, the table of CSI-RS resource IDs via RRC signaling; and/or
  receiving, from the serving base station, the table of combinations of DL PRS resource IDs, DL PRS resource set IDs, and TRP IDs via RRC signaling.

14. The method of claim 1, further comprising:
  receiving a table from the serving base station via RRC signaling, each entry of the table including the type of the spatial relation reference signal and the ID of the spatial relation reference signal.

15. The method of claim 14, wherein the table is for an SRS resource, an SRS resource set, a bandwidth part (BWP), or a component carrier for the SP SRS-for-positioning.

16. The method of claim 1, wherein the identifier field comprises an eight-bit field including the ID of the spatial relation reference signal.

17. The method of claim 16, wherein the eight-bit field is a combination of an $F_i$ field having a length of one bit and a resource $ID_i$ field having a length of seven bits.

18. The method of claim 1, further comprising:
  receiving, from the serving base station via RRC signaling, a configuration of the type of the spatial relation reference signal as the SSB or the DL PRS resource.

19. The method of claim 1, wherein:
  the LCID indicates the activation or deactivation of the SP SRS-for-positioning, and
  the MAC-CE includes at least one three-bit $F_i$ field identifying the type of the spatial relation reference signal and at least one spatial relation information field including the ID of the spatial relation reference signal.

20. The method of claim 1, wherein the spatial relation reference signal is a quasi-colocation (QCL) source reference signal.

21. A method of wireless communication performed by a base station, comprising:
  transmitting, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and receiving, from the UE, the SP SRS-for-positioning on one or more SRS resources configured to the UE for transmission of the SP SRS-for-positioning, the SP SRS-for-positioning having transmission parameters adopted from the spatial relation reference signal.

22. The method of claim 21, wherein the SRS-for-communication resource is identified by a five-bit SRS resource identifier (ID).

23. The method of claim 21, wherein the SSB is identified by a 16-bit SSB ID and physical cell identity (PCI) of the SSB.

24. The method of claim 21, wherein the CSI-RS resource is identified by an eight-bit CSI-RS resource ID.

25. The method of claim 21, wherein the SRS-for-positioning resource is identified by a five-bit SRS resource identifier.

26. The method of claim 21, wherein the DL PRS resource is identified by a 17-bit DL PRS resource ID, DL PRS resource set ID, and transmission-reception point (TRP) ID.

27. The method of claim 21, wherein, based on the type of the spatial relation reference signal, the identifier field includes:
the SRS resource ID of the SRS-for-communication resource,
an index value into a table of combinations of SSB IDs and PCIs,
the CSI-RS resource ID,
the SRS resource ID of the SRS-for-positioning resource, or
an index value into a table of combinations of DL PRS resource IDs, DL PRS resource set IDs, and TRP IDs.

28. The method of claim 27, further comprising, based on the type of the spatial relation reference signal:
transmitting, to the UE, the table of combinations of SSB IDs and PCIs via radio resource control (RRC) signaling; and/or
transmitting, to the UE, the table of combinations of DL PRS resource IDs, DL PRS resource set IDs, and TRP IDs via RRC signaling.

29. The method of claim 21, wherein the identifier field includes one or more bits indicating whether the type of the spatial relation reference signal is the SRS-for-communication resource or the SRS-for-positioning resource.

30. The method of claim 29, wherein the identifier field includes six bits for the SRS resource ID of the SRS-for-communication resource or the SRS resource ID of the SRS-for-positioning resource.

31. The method of claim 21, wherein the identifier field includes at least one bit indicating whether the type of the spatial relation reference signal is the SSB, the CSI-RS resource, the DL PRS resource, or an SRS resource.

32. The method of claim 31, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

33. The method of claim 32, further comprising:
transmitting, to the UE, the table of combinations of SSB IDs and PCIs via RRC signaling;
transmitting, to the UE, the table of CSI-RS resource IDs via RRC signaling; and/or
transmitting, to the UE, the table of combinations of DL PRS resource IDs, DL PRS resource set IDs, and TRP IDs via RRC signaling.

34. The method of claim 21, further comprising:
transmitting a table to the UE via RRC signaling, each entry of the table including the type of the spatial relation reference signal and the ID of the spatial relation reference signal.

35. The method of claim 34, wherein the table is for an SRS resource, an SRS resource set, a bandwidth part (BWP), or a component carrier for the SP SRS-for-positioning.

36. The method of claim 21, wherein the identifier field comprises an eight-bit field including the ID of the spatial relation reference signal.

37. The method of claim 36, wherein the eight-bit field is a combination of an $F_i$ field having a length of one bit and a resource $ID_i$ field having a length of seven bits.

38. The method of claim 21, further comprising:
transmitting, to the UE via RRC signaling, a configuration of the type of the spatial relation reference signal as the SSB or the DL PRS resource.

39. The method of claim 21, wherein:
the LCD indicates the activation or deactivation of the SP SRS-for-positioning, and
the MAC-CE includes at least one three-bit $F_i$ field identifying the type of the spatial relation reference signal and at least one spatial relation information field including the ID of the spatial relation reference signal.

40. The method of claim 21, wherein the spatial relation reference signal is a quasi-colocation (QCL) source reference signal.

41. A user equipment (UE), comprising:
a memory;
at least one transceiver; and
at least one processor communicatively coupled to the memory and the at least one transceiver, the at least one processor configured to:
receive, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning; and
transmit the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

42. The UE of claim 41, wherein the SRS-for-communication resource is identified by a five-bit SRS resource ID.

43. The UE of claim 41, wherein the SSB is identified by a 16-bit SSB ID and physical cell identity (PCI) of the SSB.

44. The UE of claim 41, wherein the CSI-RS resource is identified by an eight-bit CSI-RS resource ID.

45. The UE of claim 41, wherein the SRS-for-positioning resource is identified by a five-bit SRS resource ID.

46. The UE of claim 41, wherein the DL PRS resource is identified by a 17-bit DL PRS resource ID, DL PRS resource set ID, and transmission-reception point (TRP) ID.

47. The UE of claim 41, wherein, based on the type of the spatial relation reference signal, the identifier field includes:
the SRS resource ID of the SRS-for-communication resource,
an index value into a table of combinations of SSB IDs and PCIs,
the CSI-RS resource ID,
the SRS resource ID of the SRS-for-positioning resource, or
an index value into a table of combinations of DL PRS resource IDs, DL PRS resource set IDs, and TRP IDs.

48. The UE of claim 47, wherein the at least one processor is further configured to, based on the type of the spatial relation reference signal:
receive, from the serving base station, the table of combinations of SSB IDs and PCIs via radio resource control (RRC) signaling; and/or
receive, from the serving base station, the table of combinations of DL PRS resource IDs, DL PRS resource set IDs, and TRP IDs via RRC signaling.

49. The UE of claim 41, wherein the identifier field includes one or more bits indicating whether the type of the spatial relation reference signal is the SRS-for-communication resource or the SRS-for-positioning resource.

50. The UE of claim 49, wherein the identifier field includes six bits for the SRS resource ID of the SRS-for-communication resource or the SRS resource ID of the SRS-for-positioning resource.

51. The UE of claim 41, wherein the identifier field includes at least one bit indicating whether the type of the spatial relation reference signal is the SSB, the CSI-RS resource, the DL PRS resource, or an SRS resource.

52. The UE of claim 51, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

53. The UE of claim 52, wherein the at least one processor is further configured to:
receive, from the serving base station, the table of combinations of SSB IDs and PCIs via RRC signaling;
receive, from the serving base station, the table of CSI-RS resource IDs via RRC signaling; and/or
receive, from the serving base station, the table of combinations of DL PRS resource IDs, DL PRS resource set IDs, and TRP IDs via RRC signaling.

54. The UE of claim 41, wherein the at least one processor is further configured to:
receive a table from the serving base station via RRC signaling, each entry of the table including the type of the spatial relation reference signal and the ID of the spatial relation reference signal.

55. The UE of claim 54, wherein the table is for an SRS resource, an SRS resource set, a bandwidth part (BWP), or a component carrier for the SP SRS-for-positioning.

56. The UE of claim 41, wherein the identifier field comprises an eight-bit field including the ID of the spatial relation reference signal.

57. The UE of claim 56, wherein the eight-bit field is a combination of an $F_i$ field having a length of one bit and a resource $ID_i$ field having a length of seven bits.

58. The UE of claim 41, wherein the at least one processor is further configured to:
receive, from the serving base station via RRC signaling, a configuration of the type of the spatial relation reference signal as the SSB or the DL PRS resource.

59. The UE of claim 41, wherein:
the LCD indicates the activation or deactivation of the SP SRS-for-positioning, and the MAC-CE includes at least one three-bit $F_i$ field identifying the type of the spatial relation reference signal and at least one spatial relation information field including the ID of the spatial relation reference signal.

60. The UE of claim 41, wherein the spatial relation reference signal is a quasi-colocation (QCL) source reference signal.

61. A base station, comprising:
a memory;
at least one transceiver; and
at least one processor communicatively coupled to the memory and the at least one transceiver, the at least one processor configured to:
transmit, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and
receive, from the UE, the SP SRS-for-positioning on one or more SRS resources configured to the UE for transmission of the SP SRS-for-positioning, the SP SRS-for-positioning having transmission parameters adopted from the spatial relation reference signal.

62. The base station of claim 61, wherein the SRS-for-communication resource is identified by a five-bit SRS resource identifier (ID).

63. The base station of claim 61, wherein the SSB is identified by a 16-bit SSB ID and physical cell identity (PCI) of the SSB.

64. The base station of claim 61, wherein the CSI-RS resource is identified by an eight-bit CSI-RS resource ID.

65. The base station of claim 61, wherein the SRS-for-positioning resource is identified by a five-bit SRS resource identifier.

66. The base station of claim 61, wherein the DL PRS resource is identified by a 17-bit DL PRS resource ID, DL PRS resource set ID, and transmission-reception point (TRP) ID.

67. The base station of claim 61, wherein, based on the type of the spatial relation reference signal, the identifier field includes:
 the SRS resource ID of the SRS-for-communication resource,
 an index value into a table of combinations of SSB IDs and PCIs,
 the CSI-RS resource ID,
 the SRS resource ID of the SRS-for-positioning resource, or
 an index value into a table of combinations of DL PRS resource IDs, DL PRS resource set IDs, and TRP IDs.

68. The base station of claim 67, wherein the at least one processor is further configured to, based on the type of the spatial relation reference signal:
 transmit, to the UE, the table of combinations of SSB IDs and PCIs via radio resource control (RRC) signaling; and/or
 transmit, to the UE, the table of combinations of DL PRS resource IDs, DL PRS resource set IDs, and TRP IDs via RRC signaling.

69. The base station of claim 61, wherein the identifier field includes one or more bits indicating whether the type of the spatial relation reference signal is the SRS-for-communication resource or the SRS-for-positioning resource.

70. The base station of claim 69, wherein the identifier field includes six bits for the SRS resource ID of the SRS-for-communication resource or the SRS resource ID of the SRS-for-positioning resource.

71. The base station of claim 61, wherein the identifier field includes at least one bit indicating whether the type of the spatial relation reference signal is the SSB, the CSI-RS resource, the DL PRS resource, or an SRS resource.

72. The base station of claim 71, wherein the identifier field includes a seven-bit index value into a table of combinations of SSB IDs and PCIs, a seven-bit index value into a table of CSI-RS resource IDs, or a seven-bit index value into a table of combinations of DL PRS resource IDs, DL PRS resource set IDs, and TRP IDs.

73. The base station of claim 72, wherein the at least one processor is further configured to:
 transmit, to the UE, the table of combinations of SSB IDs and PCIs via RRC signaling;
 transmit, to the UE, the table of CSI-RS resource IDs via RRC signaling; and/or
 transmit, to the UE, the table of combinations of DL PRS resource IDs, DL PRS resource set IDs, and TRP IDs via RRC signaling.

74. The base station of claim 61, wherein the at least one processor is further configured to:
 transmit a table to the UE via RRC signaling, each entry of the table including the type of the spatial relation reference signal and the ID of the spatial relation reference signal.

75. The base station of claim 74, wherein the table is for an SRS resource, an SRS resource set, a bandwidth part (BWP), or a component carrier for the SP SRS-for-positioning.

76. The base station of claim 61, wherein the identifier field comprises an eight-bit field including the ID of the spatial relation reference signal.

77. The base station of claim 76, wherein the eight-bit field is a combination of an $F_i$ field having a length of one bit and a resource $ID_i$ field having a length of seven bits.

78. The base station of claim 61, wherein the at least one processor is further configured to:
 transmit, to the UE via RRC signaling, a configuration of the type of the spatial relation reference signal as the SSB or the DL PRS resource.

79. The base station of claim 61, wherein:
 the LCD indicates the activation or deactivation of the SP SRS-for-positioning, and
 the MAC-CE includes at least one three-bit $F_i$ field identifying the type of the spatial relation reference signal and at least one spatial relation information field including the ID of the spatial relation reference signal.

80. The base station of claim 61, wherein the spatial relation reference signal is a quasi-colocation (QCL) source reference signal.

81. A user equipment (UE), comprising:
 means for receiving, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning; and
 means for transmitting the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

82. A base station, comprising:
 means for transmitting, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and means for receiving, from the UE, the SP SRS-for-positioning on one or more SRS resources configured to the UE for transmission of the SP SRS-for-positioning, the SP SRS-for-positioning having transmission parameters adopted from the spatial relation reference signal.

83. A non-transitory computer-readable medium storing computer-executable instructions, the computer-executable instructions comprising:
at least one instruction instructing a user equipment (UE) to receive, from a serving base station, a medium access control control element (MAC-CE) indicating activation or deactivation of a semi-persistent (SP) sounding reference signal (SRS)-for-positioning, wherein a reserved bit in the MAC-CE or a logical channel identifier (LCID) of a MAC subheader of the MAC-CE indicates the activation or deactivation of the SP SRS-for-positioning; and
at least one instruction instructing the UE to transmit the SP SRS-for-positioning on one or more SRS resources configured for the UE, the SP SRS-for-positioning having transmission parameters adopted from a spatial relation reference signal for the SP SRS-for-positioning, an identifier (ID) of the spatial relation reference signal determined based on an identifier field for the spatial relation reference signal in the MAC-CE, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource.

84. A non-transitory computer-readable medium storing computer-executable instructions, the computer-executable instructions comprising:
at least one instruction instructing a base station to transmit, to a user equipment (UE), a medium access control control element (MAC-CE) indicating activation or deactivation of a semi-persistent (SP) sounding reference signal (SRS)-for-positioning, wherein a reserved bit in the MAC-CE or a logical channel identifier (LCD) of a MAC subheader of the MAC-CE indicates the activation or deactivation of the SP SRS-for-positioning, wherein the MAC-CE includes an identifier field from which an identifier (ID) of a spatial relation reference signal for the SP SRS-for-positioning can be determined, wherein a type of the spatial relation reference signal is one of (1) an SRS-for-communication resource, (2) a synchronization signal block (SSB), (3) a channel state information reference signal (CSI-RS) resource, (4) an SRS-for-positioning resource, or (5) a downlink positioning reference signal (DL PRS) resource, and wherein the identifier field includes three bits indicating whether the type of the spatial relation reference signal is the SRS-for-communication resource, the SRS-for-positioning resource, the SSB, the CSI-RS resource, or the DL PRS resource; and
at least one instruction instructing the base station to receive, from the UE, the SP SRS-for-positioning on one or more SRS resources configured to the UE for transmission of the SP SRS-for-positioning, the SP SRS-for-positioning having transmission parameters adopted from the spatial relation reference signal.

\* \* \* \* \*